Sept. 12, 1967  R. HAGEN  3,340,569
APPARATUS FOR PRODUCING HOLLOW PLASTIC ARTICLES
Filed Feb. 12, 1964  7 Sheets-Sheet 1

INVENTOR
REINOLD HAGEN
BY
Michael J. Striker
his ATTORNEY

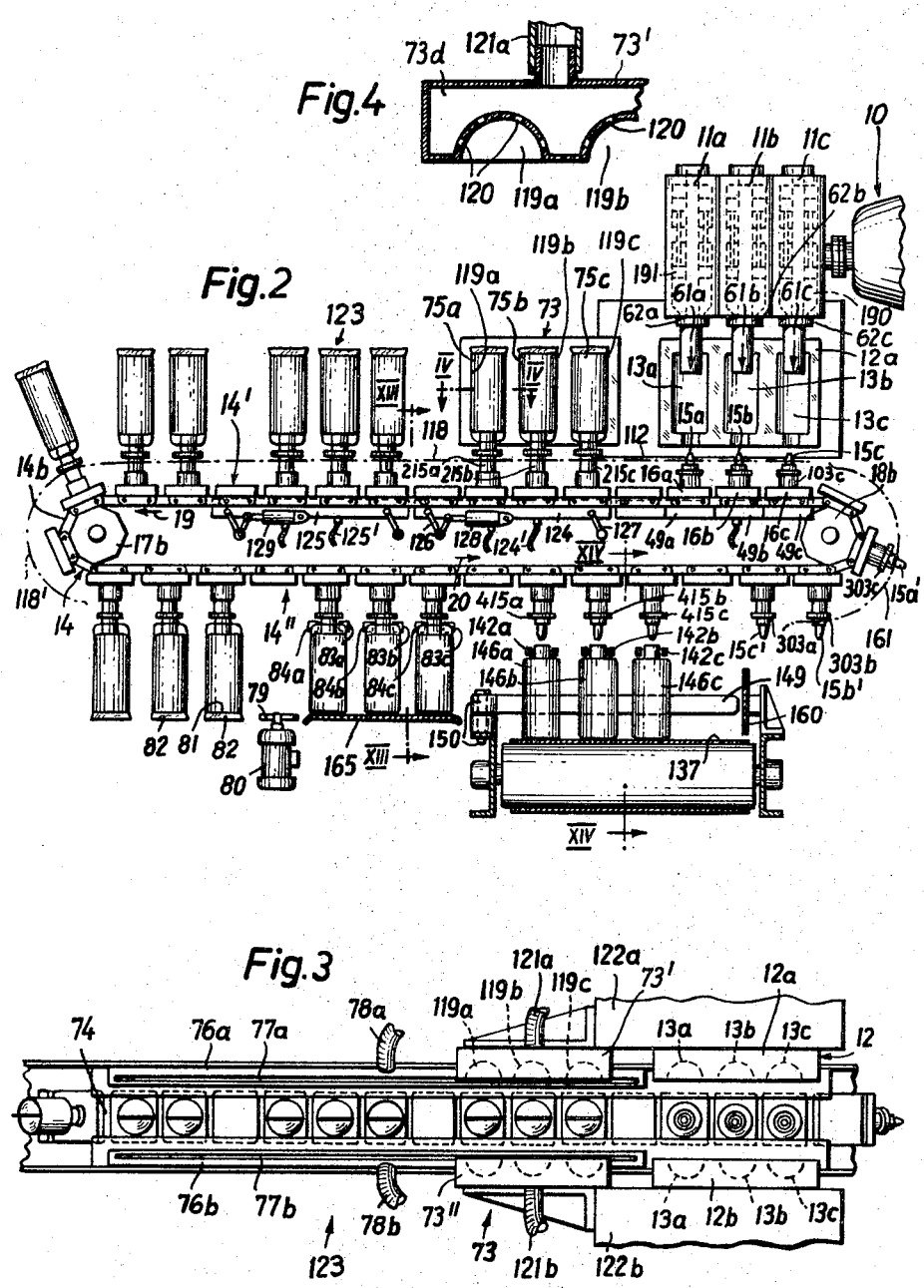

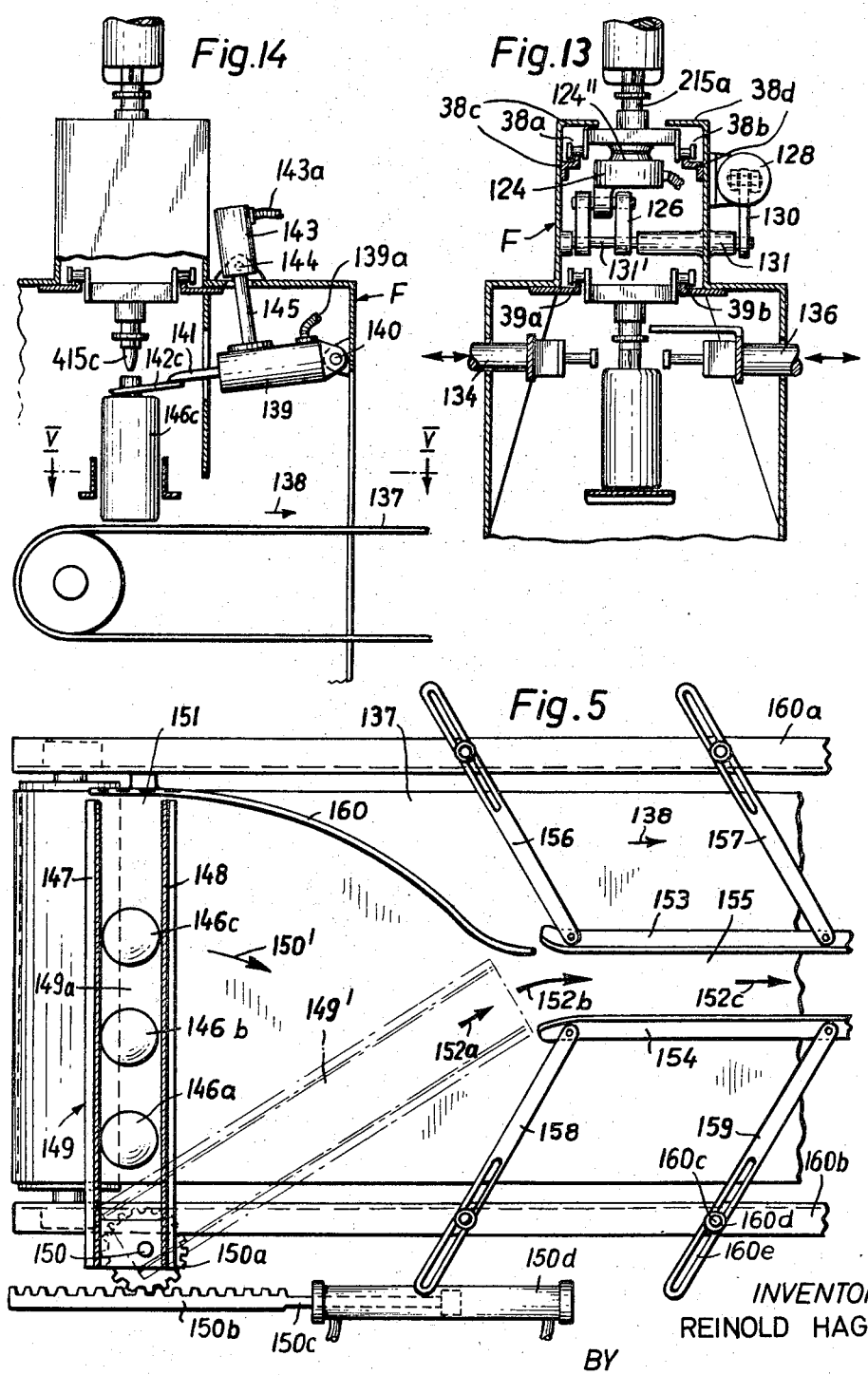

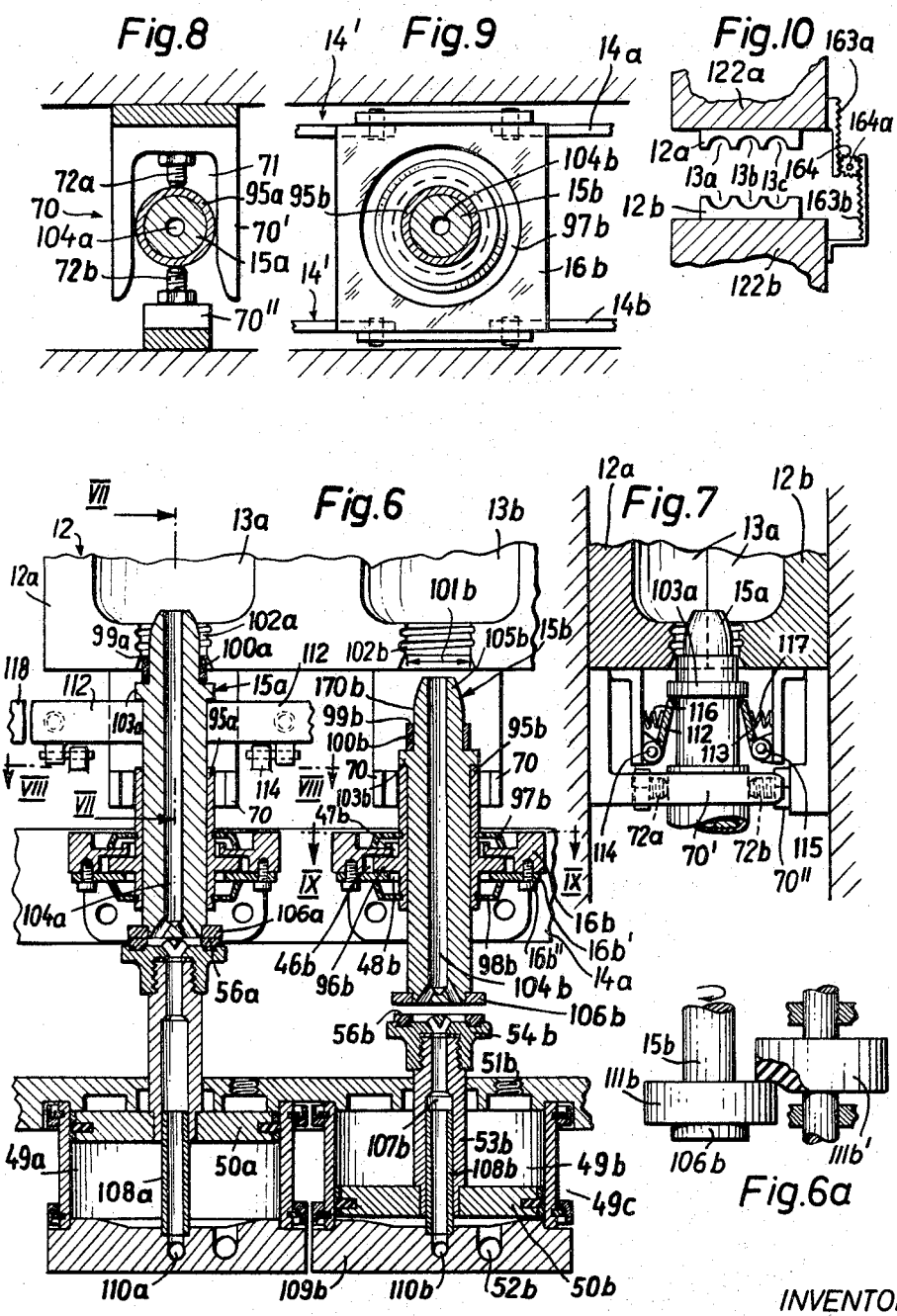

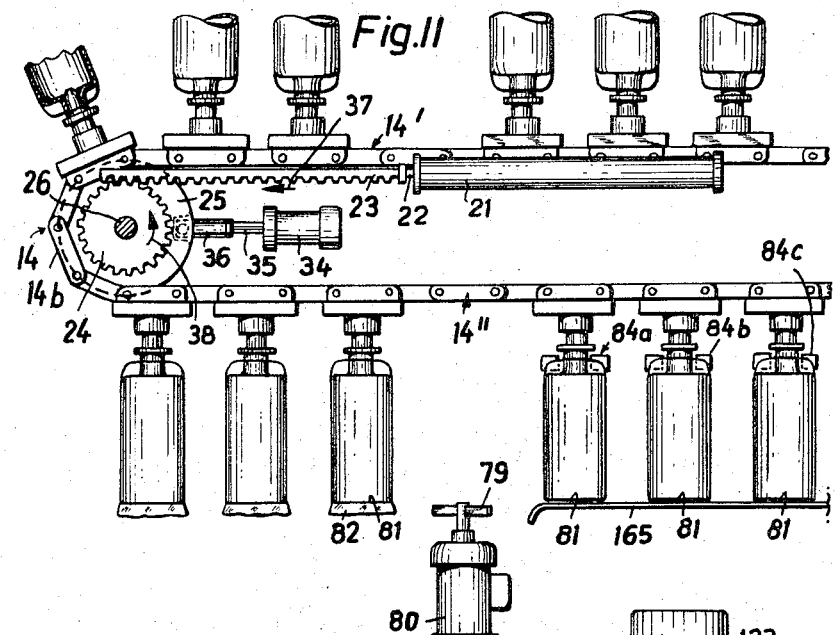
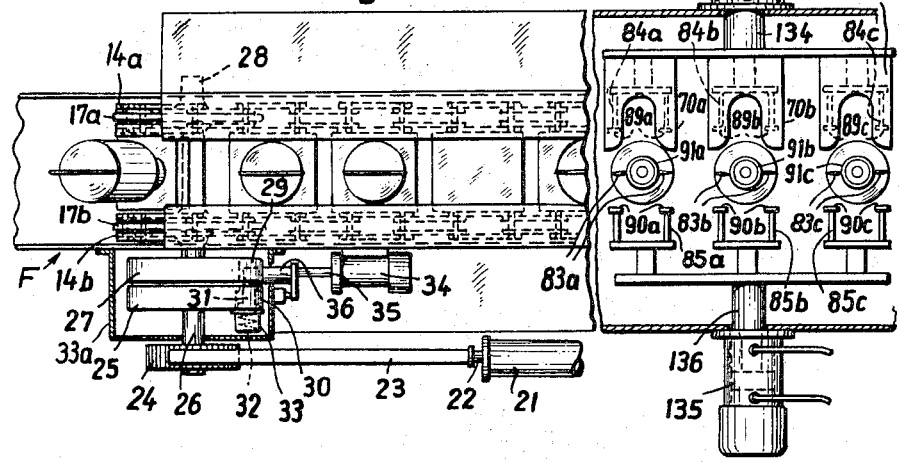

Sept. 12, 1967 R. HAGEN 3,340,569
APPARATUS FOR PRODUCING HOLLOW PLASTIC ARTICLES
Filed Feb. 12, 1964 7 Sheets-Sheet 6

INVENTOR
REINOLD HAGEN
BY
Michael J. Striker
his ATTORNEY

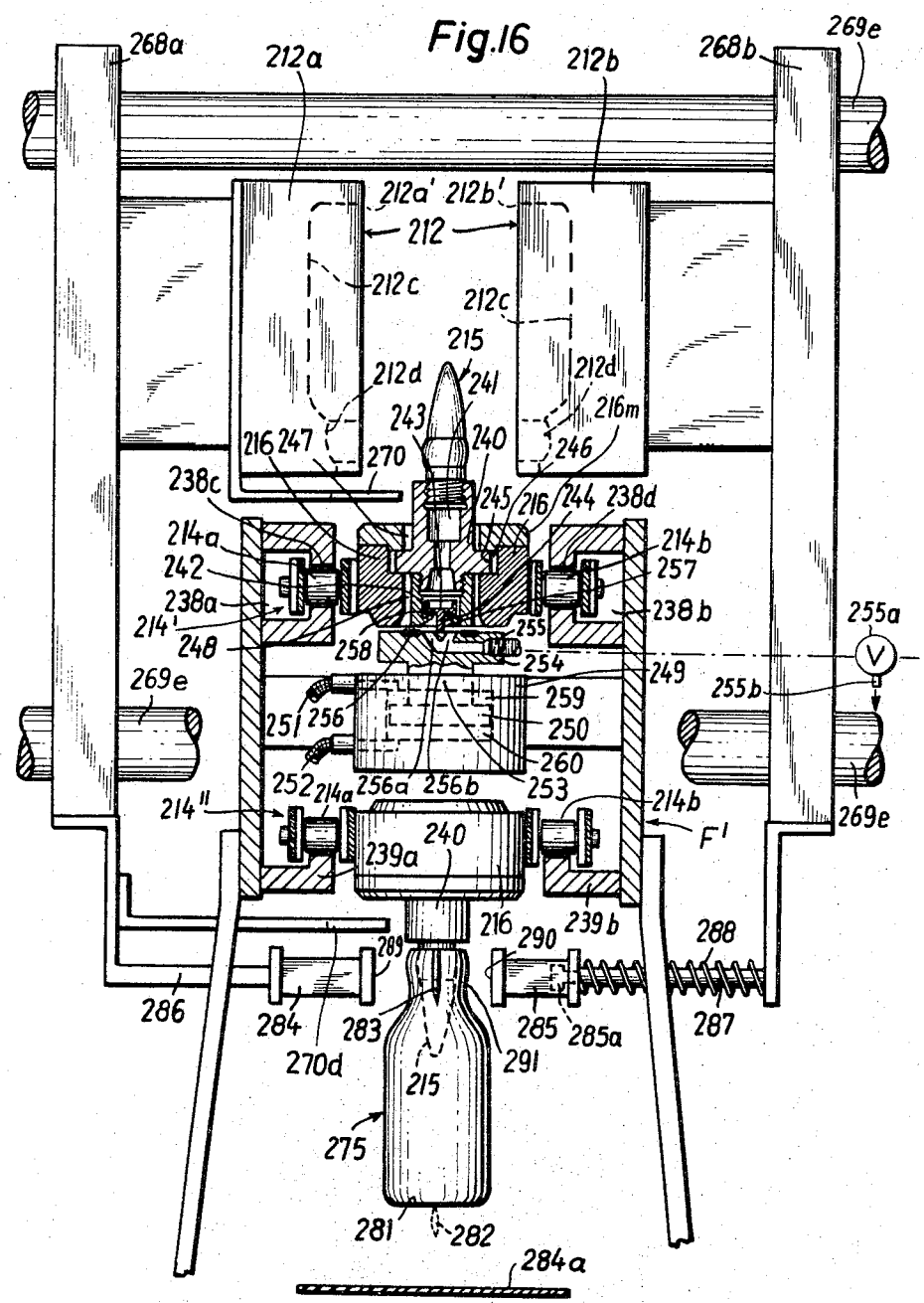

United States Patent Office 3,340,569
Patented Sept. 12, 1967

3,340,569
APPARATUS FOR PRODUCING HOLLOW
PLASTIC ARTICLES
Reinold Hagen, Hangelar uber Siegburg,
Rhineland, Germany
Filed Feb. 12, 1964, Ser. No. 344,419
Claims priority, application Germany, Feb. 16, 1963,
K 48,967
22 Claims. (Cl. 18—5)

ABSTRACT OF THE DISCLOSURE

An endless conveyor of the blow molding apparatus carries mandrels which extend vertically upwardly during registry with the extrusion nozzle. The mandrels are driven intermittently and advance beyond the mold before the material of freshly extruded and inflated articles sets. During travel away from registry with the nozzle, each mandrel remains in vertical position for a period of time which suffices to allow for setting of the article carried by such mandrel.

---

The present invention relates to an apparatus for producing plastic bottles, jars, flasks, vials, ampoules and similar hollow articles. More particularly, the invention relates to an improved apparatus for the production of hollow thermoplastic articles by the blow molding method.

It is an important object of the present invention to provide an apparatus for the production of hollow thermoplastic articles by the blow molding method wherein a single article or a group of simultaneously expanded articles may be removed from the blow mold prior to complete hardening of its material so that the blow molding operations may be carried out in rapid sequence with resultant increase in output.

Another object of the invention is to provide an apparatus of the just outlined characteristics wherein a large number of operations including extrusion of parisons and expansion of parisons in one or more blow molds may be carried out in a very small area.

A further object of the invention is to provide an apparatus for the production of thermoplastic bottles and similar hollow articles wherein the same instrumentalities which cooperate with the blow mold to expand one or more parisons against the surfaces surrounding the mold cavity may perform additional important functions so that the number of parts may be reduced to a bare minimum without in any way affecting the accuracy and/or the speed of various operations to which the parisons and the articles must be subjected on their way to a filling, sterilizing, printing, labelling or storing station.

An additional object of the invention is to provide an apparatus of the above outlined characteristics wherein the articles are shaped and processed in such a way that certain of their portions, particularly the neck portions which must be calibrated with sufficient precision to take serially produced caps or lids, are positively held against any deformation, particularly at the time when the plastic material is still in highly deformable state.

Still another object of the invention is to provide an apparatus for the production of plastic bottles or the like wherein the blowing mandrels which are utilized to admit compressed blowing fluid into freshly extruded parisons need not be detached from the thus obtained hollow articles until after the articles undergo a large number of additional treatments including cooling, straightening, deburring (removal of fins or burrs which develop when the mold sections are closed around a parison and when the parison receives the mandrel), trimming, firing and/or others.

Another object of my invention is to provide an apparatus of the above outlined characteristics wherein two or more hollow plastic articles may be formed, advanced, treated, processed and stripped in a simultaneous operation and at exceptionally short intervals.

Another object of my invention is to provide an apparatus wherein two or more hollow plastic articles may be formed, advanced, treated, processed and stripped in a simultaneous operation and at exceptionally short intervals.

A further object of the invention is to construct and to assemble the blow molding apparatus in such a way that, with a minimum of additional expenses and material, its output exceeds substantially (normally several times) the output of all such blow molding apparatus of which I have knowledge at this time.

An additional object of the invention is to provide a blow molding apparatus for mass-production of plastic bottles and similar hollow articles which is constructed and assembled with a view to permit for removal of freshly extruded and expanded articles from the blowing station at intervals which are much shorter than the intervals necessary for complete setting of such articles so that the extrusion and blowing of consecutive parisons or groups of parisons can take place in rapid sequence without in any way affecting the quality of the ultimate products.

Another object of the invention is to provide a molding apparatus of the above outlined characteristics which may be rapidly and conveniently converted for simultaneous extrusion, blowing and processing of two, three or more hollow articles at a time.

An additional object of the invention is to provide a blow molding apparatus which is constructed and assembled in such a way that freshly extruded and expanded articles may be cooled internally and externally in a simultaneous operation and wherein such cooling contributes to elimination or prevention of any deformities which might have developed when an article whose thermoplastic material is still in deformable state is removed from and advanced beyond the blowing station.

Another object of the invention is to provide a blow molding apparatus for the production of plastic bottles and the like wherein the cooling medium may be utilized to eliminate deformities of freshly extruded and expanded articles so that the material of the articles will set and the articles will become self-supporting at the time each thereof is of identical size and/or shape.

A concomitant object of the invention is to provide a blow molding apparatus of the above outlined characteristics which is constructed and assembled in such a way that it automatically ejects consecutively or simultaneously extruded, expanded and otherwise processed articles in the form of a single file of articles which may be immediately transferred into further processing apparatus without necessitating regrouping and/or realigning of articles so that the improved apparatus may constitute the first of a chain of apparatus which not only produce but also clean, fill, label, imprint, seal, stack and/or package bottles, vials, flasks, jars and similar hollow articles.

Another object of the invention is to provide a blow molding apparatus wherein, without any danger of overheating, the mandrels which serve to admit a blowing gas into consecutively or simultaneously extruded parisons need not be subjected to any cooling action even though the parisons may be extruded at exceptionally short intervals.

Still another object of the invention is to provide a blow molding apparatus wherein a large number of treating and processing stations may be accommodated in a very small area and wherein the various stations may be distributed in such a way that certain mechanisms which operate the instrumentalities at a first station may also control and/or initiate operation of instrumentalities at one or more additional stations so that the number of hydraulic, pneumatic, electric and/or mechanical actuating devices may be reduced to a minimum with resultant reduction in the initial cost, maintenance cost and weight of the apparatus.

A further object of the invention is to provide a blow molding apparatus which embodies an improved advancing conveyor enabling the apparatus to extrude, expand and otherwise process one, two, three or more hollow plastic articles at a time.

Another object of the invention is to provide improved cooling, deburring, centering, aligning, locking, expanding, straightening, stripping and advancing devices which may be utilized in a blow molding apparatus of the just outlined characteristics.

In one of its preferred forms, the blow molding apparatus of my invention comprises an extruding machine including at least one extrusion nozzle arranged to discharge a plastic tube downwardly, an endless belt, chain or a similar conveyor arranged to advance in an endless path comprising a horizontal portion adjacent to but spaced from and located at a level below the nozzle, an open-and-shut blow mold disposed between the nozzle and the horizontal portion of the path and defining a mold cavity arranged to accommodate a length of plastic tube issuing from the nozzle, a plurality of blowing mandrels secured to the conveyor in such a way that a mandrel located in the horizontal portion of the path extends upwardly, and advancing means for intermittently advancing the conveyor through such distances that a mandrel momentarily located in the horizontal portion of the path registers with the mold cavity during each interval between consecutive intermittent advances of the conveyor.

The novel features which are considered as characteristic of the invention are set forth in particular in the appended claims. The improved blow molding apparatus itself, however, both as to its construction and its mode of operation, together with additional features and advantages thereof, will be best understood upon perusal of the following detailed description of certain specific embodiments with reference to the accompanying drawings, in which:

FIG. 2 is a side elevational view of a portion of the extruding machine and of an advancing conveyor which serves to move the blowing mandrels in an endless path toward, through and past several treating and processing stations in the blow molding apparatus of FIG. 1;

FIG. 3 is a fragmentary top plan view of the structure shown in FIG. 2 with the extruding machine omitted and showing in detail two cooling stations which follow the blowing station;

FIG. 4 is a greatly enlarged horizontal section through a portion of the first cooling device as seen in the direction of arrows from the line IV—IV of FIG. 2;

FIG. 5 is an enlarged fragmentary top plan view of a take-off conveyor which serves to remove finished articles from the apparatus of FIG. 1 and which cooperates with an aligning device to form a single file of finished articles, the view of FIG. 5 being taken in the direction of arrows as seen from the line V—V of FIG. 14;

FIG. 6 is a greatly enlarged axial section through a pair of adjacent blowing mandrels and through the associated holders which connect the mandrels with the advancing conveyor of FIG. 2, further showing the devices which cause portions of the mandrels to reciprocate and which admit blasts of compressed blowing fluid into the freshly extruded parisons at the blowing station;

FIG. 6a is a fragmentary schematic side elevational view of a drive means which serves to rotate a blowing mandrel during a certain stage of its travel with the advancing conveyor;

FIG. 7 is a vertical section as seen in the direction of arrows from the line VII—VII of FIG. 6 and illustrates a portion of a locking device which serves to maintain certain portions of the mandrels in their outer end positions while the mandrels travel along the upper stringers of the advancing conveyor;

FIG. 8 is a horizontal section as seen in the direction of arrows from the line VIII—VIII of FIG. 6 and illustrates a centering device which serves to move a blowing mandrel in requisite alignment with the sections of the blow mold and with an extrusion nozzle;

FIG. 9 is a horizontal section as seen in the direction of arrows from the line IX—IX of FIG. 6 and illustrates the outer side of a holder for the right-hand blowing mandrel of FIG. 6;

FIG. 10 is a transverse horizontal section through the blow mold and illustrates a device which serves to guide the mold sections into and out of sealing engagement with each other;

FIG. 11 is a greatly enlarged fragmentary detail view of the structure shown in the left-hand portion of FIG. 2 including a mechanism which serves to cause stepwise advances of the conveyor, and two deburring stations wherein the articles are separated from fins which develop on closing of the blow mold and on penetration of blowing mandrels into the aligned mold cavities;

FIG. 12 is a top plan view of the structure shown in FIG. 11 and a top plan view of the right-hand (second) deburring station, portions of the upper stringers of the advancing conveyor being broken away to reveal this second deburring station at which the blow molding apparatus removes fins from the neck portions of the articles;

FIG. 13 is a vertical section as seen in the direction of arrows from the line XIII—XIII of FIG. 2 and illustrates one of the headers which deliver compressed coolant to hollow articles at the first cooling station and also a portion of the second deburring station;

FIG. 14 is a vertical section as seen in the direction of arrows from the line XIV—XIV of FIG. 2 and illustrates the ejector mechanism at the stripping station at which the articles are separated from the blowing mandrels to be transferred onto and to be aligned on the take-off conveyor;

FIG. 16 is a greatly enlarged detail view of the structure shown in the right-hand part of FIG. 15, a holder for a simplified blowing mandrel being shown in transverse vertical section.

Figure 1:
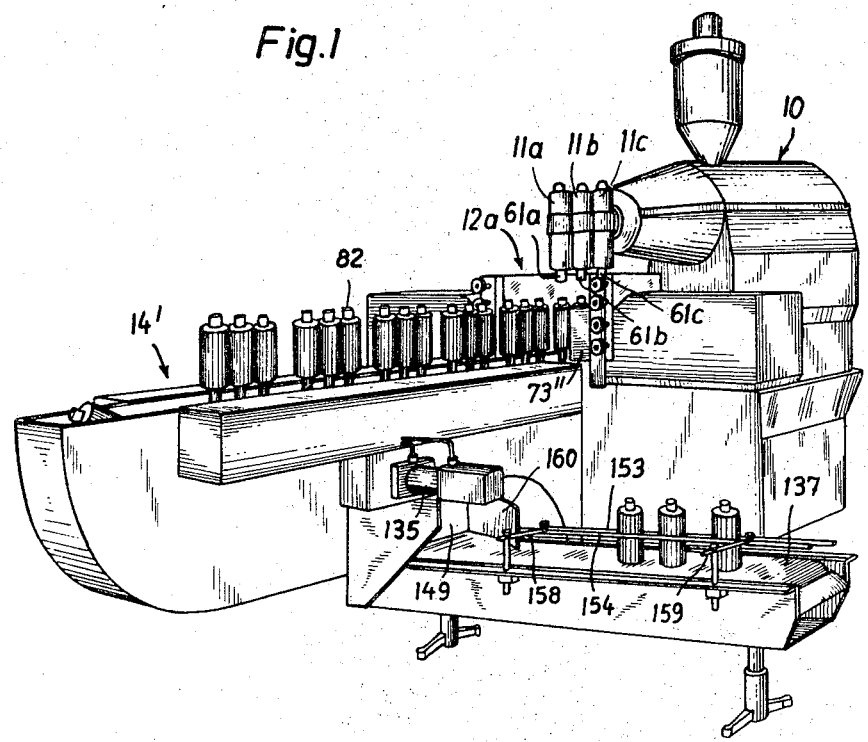
FIG. 1 is a perspective view of a blow molding apparatus which is constructed and assembled in accordance with a first embodiment of my invention and whose extruding machine is arranged to extrude three plastic tubes at a time, certain parts of the cooling devices for the hollow articles having been omitted for the sake of clarity.

Referring to FIGS. 1 and 2, there is shown a blow molding apparatus which produces plastic bottles or similar hollow thermoplastic articles in a mass-manufacturing operation and in such a way that several articles are extruded, blown, cooled, deburred and stripped in a simultaneous operation. The apparatus comprises an extruding machine 10 provided with three aligned equidistant extruding heads 11a, 11b, 11c each having at its lower end an annular extrusion nozzle 62a, 62b, 62c arranged to discharge downwardly a continuous tube 61a, 61b, 61c of synthetic thermoplastic material, for example, polyethylene or another substance which may be utilized in the production of plastic bottles, jars, flasks, vials and similar hollow articles. The exact construction of the extruding machine 10 and of its heads 11a–11c forms no part of this invention. The nozzles 62a–62c are located at a level above an open-and-shut blow mold 12 having two reciprocable sections 12a, 12b at least one of which is movable toward and away from the other section, and each of these mold sections is provided with three recesses. When the mold sections 12a, 12b are moved into abutment with each other, the pairs of equally numbered recesses define three equidistant mold cavities 13a–13c each of which may receive an open-ended parison consisting of a length of plastic tube 61a, 61b, 61c respectively issuing from the nozzles 62a, 62b, 62c. The upper end of each of these mold cavities is then in registry with one of the extrusion nozzles 62a–62c and with one of three coplanar equidistant blowing and calibrating mandrels 15a, 15b, 15c. These mandrels are mounted on holders 16a, 16b, 16c which are secured to an advancing conveyor 14. The advancing conveyor 14 comprises two endless flexible elements here shown as link chains 14a, 14b which are disposed in two spaced parallel vertical planes so that each thereof comprises a straight horizontal upper portion or stringer 14' and a straight horizontal lower portion or stringer 14". The chain 14b is trained around a pair of sprockets 17b, 18b, and the chain 14a is trained around a sprocket 17a, shown in FIG. 12, and around a fourth sprocket which is coaxial with the sprocket 18b but is not shown in the drawings. The sprockets 17a, 17b constitute two rotary driving members which serve to drive the respective chains 14a, 14b in such a way that the upper stringers 14' advance intermittently (i.e., in stepwise fashion) in a direction to the left, as viewed in FIG. 2 (arrow 19) and that the lower stringers 14" advance in a direction to the right (arrow 20). The endless path in which the conveyor advances includes a straight horizontal portion 74 extending below the mold sections 12a, 12b and accommodating the upper stringers 14' of the conveyor 14.

The advancing device for intermittently advancing the conveyor 14 in stepwise fashion is illustrated in FIGS. 11 and 12. This advancing device comprises a double-acting horizontal cylinder 21 whose piston rod 22 is connected with an elongated rack 23 meshing with a rotary element here shown as a pinion 24 which is fixed to the shaft 26 of a first clutch disk 25. The disk 25 and the pinion 24 are rigidly secured to the shaft 26, and the disk 25 is closely adjacent to a second clutch disk 27 which is rigidly mounted on the shaft 28 of the driver sprockets 17a, 17b, i.e., the parts 17a, 17b, 27 and 28 always rotate as a unit. The disk 27 is provided with a peripheral recess 29 and the adjacent side face of the disk 25 is formed with an axially parallel recess 30 which registers with the recess 29 in a selected angular position of the disks with respect to each other, namely, once during each revolution of the disk 25 with reference to the disk 27. The recess 30 accommodates a clutch pin 31 which is biased by a helical spring 32 in such a way that the tip of the pin 31 tends to enter the peripheral recess 29 in order to couple the disk 25 to the disk 27. The spring 32 is accommodated in a small casing 33 which is secured to the exposed side face of the disk 25. The disks 25, 27 are surrounded by a shield 33a which is fixed to the main frame structure F of the blow molding apparatus.

The advancing device of FIGS. 11 and 12 further comprises a second double-acting cylinder 34 which is fixed to the frame structure F and whose piston rod 35 carries at its free end a bolt 36 which extends radially of the disk 27 and whose front end portion is provided with a suitably inclined cam face arranged to enter the peripheral recess 29 and to expel the clutch pin 31 back into the axially parallel recess 30. Of course, the tip of the clutch pin is also provided with a suitably inclined cam face so that it may move back into the casing 33 when the piston rod 35 performs a forward stroke (namely, in a direction to the left, as viewed in FIGS. 11 and 12). In other words, when the bolt 36 takes the position of FIGS. 11 and 12, the disk 27 is disconnected from the disk 25 so that the latter may rotate back and forth independently in response to reciprocatory movement of the rack 23 which meshes with the pinion 24. In addition, and when the bolt 36 actually extends into the peripheral recess 29 of the disk 27, the driver sprockets 17a, 17b are automatically arrested because the shaft 28 is rigidly connected not only with the driver sprockets but also with the disk 27.

The advancing device of FIGS. 11 and 12 operates as follows:

When the bolt 36 has been moved to the position of FIGS. 11 and 12, the conveyor 14 is arrested because the bolt 36 extends into the peripheral recess 29 and expels the clutch pin 31 back into the axially parallel recess 30 and casing 33. If the conveyor 14 is to advance by a step, the valve (not shown) which controls the admission of a fluid pressure medium into the left-hand cylinder chamber of the cylinder 34 is actuated to permit such pressure medium to enter the cylinder 34 whereby the bolt 36 is retracted from the peripheral recess 29 and the spring 32 immediately shifts the clutch pin in a sense that the pin establishes a driving connection between the disks 25, 27. In the next step, the valve which controls admission of a fluid pressure medium into the right-hand cylinder chamber of the cylinder 21 allows the pressure medium to enter the cylinder 21 whereby the rack 23 performs a forward stroke (arrow 37 in FIG. 11) and rotates the pinion 24 in a counterclockwise direction indicated in FIG. 11 by an arrow 38. The stroke of the rack 23 is selected in such a way that the upper stringers 14' of the conveyor 14 advance by a step and through a distance which is long enough to move the blowing mandrels 15a–15c beyond the blow mold 12 and to move a new group of blowing mandrels 15a', 15b', 15c' (see FIG. 2) into registry with the extrusion nozzles 62a, 62b, 62c. In other words, the spacing between the blowing mandrels of each group (15a–15c, 15a'–15c', etc.) is such that one mandrel of a group momentarily supported by the upper stringers 14' of the endless conveyor 14 extends upwardly and registers with one of the nozzles 62a–62c during each interval between consecutive intermittent advances of the conveyor. For example, the length of the forward stroke of the rack 23 may be selected in such a way that the sprockets 17a, 17b complete a full revolution in order to advance the mandrels 15a'–15c' to the blowing station which accommodates the blow mold 12. Consequently, and as soon as the disks 25, 27 complete a full revolution, the tip of the bolt 36 is again in registry with the peripheral recess 29 and, on admission of a suitable pressure medium to the right-hand chamber of the double-acting cylinder 34, the bolt 36 penetrates into the peripheral recess 29 and expels the clutch pin 31 so that the disk 27 is disconnected from the disk 25. The rack 23 then performs a return stroke to take the position of FIGS 11 and 12 whereby the pinion 24 rotates the disk 25 in a clockwise direction but the sprockets 17a, 17b remain idle because the bolt 36 is still received in the peripheral recess 29 of the disk 27 which is non-rotatably connected with the sprockets 17a, 17b. While it performs a return stroke. the rack 23 rotates the pinion 24 and disk 25 through an angle of 360 degrees which means that the peripheral recess 29 is again aligned with the axially parallel recess 30 and that the tip of the clutch pin 31 may enter the peripheral recess 29 (under the bias of the spring 32) as soon as the bolt 36 is retracted from the recess 29. The intervals between consecutive advances of the conveyor 14 are selected in such a way that the parisons momentarily received in the mold cavities 13a–13c will have enough time to expand against the mold walls and that the previously blown hollow articles which are then located at various other stations in the blow molding apparatus of my invention may undergo necessary treatment before the rack 23 again performs a forward stroke (arrow 37). The system of valves which control the operation of the cylinders 21

14 is not shown in the drawings because their construction forms no part of the present invention. For example, such valves may be actuated in a predetermined sequence by suitable trips provided on the chains 14a, 14b or by a system of time-lag relays so that the cylinders 21, 34 will be operated in a predetermined sequence and at necessary intervals.

The upper stringers 14' of the chains 14a, 14b are guided in horizontal channels 38a, 38b (see FIG. 13) defined by a pair of suitably configurated upper guide rails 38c, 38d which are secured to or form integral parts of the frame structure F. The lower stringers 14" of the chains 14a, 14b are supported by substantially L-shaped horizontal guide rails 39a, 39b.

The exact construction and mounting of the blowing mandrels is shown in FIGS. 2 and 6. FIG. 6 shows two (15a, 15b) of the three mandrels 15a–15c which are temporarily located at the blowing station. The holders 16a–16c are secured to alternating links of the chains 14a, 14b, so that the respective mandrels may travel around the end turns of the conveyor 14 (i.e., about the sprockets 17a, 17b, 18b and around the non-illustrated second sprocket for the chain 14a).

As shown in FIG. 6, the mandrels are mounted in such a way that their elongated cores may reciprocate axially with reference to the respective holders. For the sake of clarity, the core of the left-hand mandrel 15a is shown in its upper (or outer) end position, whereas the core of the mandrel 15b temporarily assumes the lower (inner) end position. However, it is to be understood that the cores of mandrels which form a group (such as the mandrels 15a–15c of FIG. 2) always reciprocate as a unit and that the illustration of FIG. 6 merely serves to facilitate the understanding of the operation of my blow molding apparatus. The construction of the mandrels 15a, 15b in FIG. 6 is identical and their parts as well as the parts of the corresponding holders 16a, 16b are identified by similar reference characters each of which is followed by a letter "a" (mandrel 15a and holder 16a) or "b" (mandrel 15b and holder 16b). The core of the mandrel 15b is reciprocably telescoped into an elongated carrier or sleeve 95b which is provided with an annular collar 96b received with radial play in a recess 46b machined in the inner side of the main body portion of the holder 16b. This holder comprises at its inner side a cover or lid 16b' which is detachably secured thereto by bolts 16b", and the lid 16b' is formed with a bore 48b whose diameter exceeds the diameter of the sleeve 95b. The main body portion of the holder 16b is also provided with a bore 47b whose diameter exceeds the diameter of the sleeve 95b and which communicates with the recess 46b. Thus, the core of the mandrel 15b and its sleeve 95b are free to move radially of the holder 16b to the extent determined by the difference between the diameters of the recess 46b and coaxial bores 47b, 48b on the one hand, and the diameters of the sleeve 95b and its collar 96b on the other hand.

The holder 16b carries two cup shaped annular diaphragms or bellows 97b, 98b of elastic material which respectively serve to seal the bores 47b, 48b from the surrounding atmosphere. Thus, and since the collar 96b is preferably lubricated to facilitate radial movements of the mandrel 15b with reference to the holder 16b, the diaphragms 97b, 98b entrap the lubricant and prevent it from reaching the parisons or the hollow articles which are produced in the blow molding apparatus of my invention. The diaphragm 97b is also shown in FIG. 9.

The outer end portion or tip 105b of the core of the mandrel 15b is provided with a projection here shown as an annular flange 103b which determines the length of the inward stroke of this core with reference to the sleeve 95b, and the flange 103b also serves as an abutment for an annular severing member or cutter 100b which surrounds the tip 105b of the core of the mandrel 15b and which is provided with an annular cutting edge 99b. The outer diameter of the cutter 100b equals or approximates the internal diameter of the sleeve 95b and the internal diameter 101b of the lower end portion 102b of the mold cavity 13b in the mold section 12a, 12b. The outer diameter of the core tips 105b (at a point 170b which is adjacent to the cutter 100b) equals the internal diameter of the lower end (neck) portion of the hollow article which is to be produced in the mold cavity 13b. The conicity of the core tip 105b serves the sole purpose of facilitating insertion of the mandrel 15b into the open lower end of a parison which is to be expanded in the mold cavity 13b so as to form a bottle or a similar hollow plastic article.

The core of the mandrel 15b is formed with an axial passage or bore 104b which serves to convey blasts of compressed air or another suitable blowing fluid so that such fluid may expand the parison (obtained by severing a length from the freshly extruded plastic tube 61b) against the surface surrounding the mold cavity 13b. As stated above, the flange 103b determines the extent to which the core of the mandrel 15b may move inwardly, i.e., toward the lower stringers 14" of the chains 14a, 14b, and a similar flange 106b is provided at the inner end of the core of the mandrel 15b to prevent this core from falling out of the holder 16b when the mandrel is inverted and travels along the lower stringers 14" of the chains. Also, the flange 106b may determine the length of the outward stroke of the core of the mandrel 15b. However, and as a rule, the length of the outward stroke of the core of the mandrel 15b will be determined by the cutter 100b which comes in abutment with the mold sections 12a, 12b and prevents further outward movement of the core. The flange 106b also performs another function which will be described later.

The device which serves to admit compressed air or another blowing fluid into the passage 104b of the core of the mandrel 15b comprises a double-acting hydraulic or pneumatic cylinder 49b which is fixed to the frame structure F intermediate the stringers 14', 14" of the conveyor 14 and which accommodates a reciprocable annular piston 50b whose hollow piston rod 53b extends upwardly and carries at its upper end an enlarged apertured portion or head 54b. This head 54b may be detached from the piston rod 53b so as to facilitate inspection, cleaning or replacement of an annular sealing ring 56b which is recessed into the exposed upper end face of the head 54b. The piston rod 53b is formed with an axial passage or bore 107b which terminates at two mutually inclined ports provided in the top wall of the head 54 so that they may convey compressed fluid into the intake end of the passage 104b in the core of the mandrel 15b. The lower portion of the passage 107b is of greater diameter and accommodates the upper portion of a tubular guide 108b which is secured to a detachable bottom wall 109b of the cylinder 49b. This tubular guide 108b communicates with the discharge end of a bore or channel 110b provided in the bottom wall 109b and leading to a source of compressed blowing fluid, not shown. For example, such source may include an air compressor or the like and the channel 110b is controlled by one or more valves which allow entry of blowing fluid at predetermined intervals. The bottom wall 109b is further provided with a bore 52b which communicates with the lower chamber of the cylinder 49b at the underside of the annular piston 50b, and the top wall of the cylinder 49b is formed with a bore 51b which may be connected with a conduit leading to a source of fluid pressure medium which may be delivered into or evacuated from the upper chamber of the cylinder 49b which is located at the upper side of the piston.

The admission of compressed blowing fluid into the passage 104b of the core of the mandrel 15b takes place in the following manner:

When the conveyor 14 has been advanced by a step so that the blowing mandrels 15a–15c are in registry with the extrusion nozzles 62a–62c, and when the blow mold 12 is closed so that the open lower ends of three parisons extend into the neck portions 102a, 102b, 102c of the respective mold cavities 13a, 13b, 13c, the valve which controls the admission of pressure medium through the bore 52b opens so that the piston 50b is moved upwardly and the sealing ring 56b engages and shifts the flange 106b upwardly, as viewed in FIG. 6, so that the core of the mandrel 15b performs a working stroke and its tip 105b penetrates into the lower end of the parison which is accommodated in the mold cavity 13b. The core of the mandrel 15b completes its working stroke when the edge 99b of the cutter 100b comes in abutment with the sections 12a, 12b of the closed mold 12 whereby the cutting edge 99b automatically trims the lower end of the parison by severing therefrom any excess plastic material. At the same time, the tip 105b of the core cooperates with the mold sections to calibrate the neck portion of the hollow article which is to be formed in the mold cavity 13b in response to admission of compressed flowing fluid through the passage 104b. When the bore 52b admits oil or another pressure medium into the lower chamber of the cylinder 49b, the bore 51b allows escape of pressure medium from the upper chamber of the cylinder 49b so that the piston 50b is free to perform a working stroke and to shift the core of the mandrel 15b axially upwardly, as viewed in FIG. 6, so that the core automatically calibrates the lower end portion of the parison by deforming the parison against the surfaces surrounding the lower end portion 102b of the mold cavity 13b. In the next step, the valve which controls admission of compressed fluid through the channel 110b is caused to open so that a compressed blowing fluid may stream through the tubular guide 108b, through the passages 107b, 104b, and into the mold cavity 13b in order to expand the upper portion of the parison against the internal surfaces of the mold sections 12a, 12b. When the core of the mandrel 15b reaches the end of its working stroke, it takes a position which corresponds to the position of the core of the mandrel 15a in FIG. 6. In the embodiment of FIG. 6, the piston 50b will come in abutment with the top wall of the cylinder 49b at the time the cutting edge 99b of the annular cutter 100b comes in abutment with the mold sections 12a, 12b. This is often advisable in order to avoid excessive wear on the mold sections and premature dulling of the cutting edge 99b.

The valve which controls the admission of compressed blowing fluid into the passage 107b of the piston rod 53b is preferably constructed and mounted in such a way that it allows inflow of blowing fluid at the time the sealing ring 56b abuts against the lower flange 106b, i.e., as soon as the arrangement shown in FIG. 6 prevents uncontrolled escape of compressed fluid. The core of the mandrel 15b completes its working stroke within a fraction of a second so that little, if any, compressed blowing fluid is wasted if the channel 110b admits such blowing fluid before the core of the mandrel 15b actually enters the lower end portion 102b of the mold cavity 13b.

In order to make sure that the cutting edge 99b of the annular cutter 100b will make a clean cut through the parison which is accommodated in the mold cavity 13b and whose lower end portion extends into the lower portion 102b of this cavity, it is often preferred to construct the blowing mandrel 15b in such a way that its core may rotate with the cutter 100b at the time it begins to penetrate into the parison. For example, and as shown in FIG. 6a, the lower end portion of the core of the mandrel 15b may be provided with a coaxial friction wheel 111b which engages a constantly rotating friction wheel 111b' as soon as the cutting edge 99b approaches the parison whereby the cutter 100b is compelled to rotate and its cutting edge forms a very satisfactory cut through the plastic material. At least a portion of at least one of the friction wheels 111b, 111b' preferably consists of rubber or similar elastic material so that the cutter 100b may rotate at the time it moves axially with the core of the mandrel 15b. The drive means for rotating the friction wheel 111b' may include a small electric motor or any other suitable device, not shown in the drawings. It goes without saying that the cores of all other blowing mandrels in the blow molding apparatus of FIGS. 1 to 14 are or may be provided with similar friction wheels which will cause the corresponding cutters to rotate during severing of parisons and while the cores of the respective mandrels penetrate into one of the cavities 13a–13c.

While I have described only the manner in which the cylinder 49b moves the core of the mandrel 15b and the manner in which the core of this mandrel 15b admits compressed blowing fluid into the mold cavity 13b, it is to be understood that the annular piston 50b is reciprocated in synchronism with the annular piston 50a of the cylinder 49a and with the annular piston of the cylinder 49c. The cylinders 49a, 49c respectively control the cores of the mandrels 15a, 15c so that these cores reciprocate in order to calibrate and seal the corresponding parisons simultaneously with the core of the mandrel 15b whose construction and operation has been described in full detail. In other words, a group of three blowing mandrels (such as the mandrels 15a–15c, 15a'–15c') always operates as a unit to simultaneously calibrate, expand and transport a group of three parisons and hollow plastic articles.

Since the cores of the blowing mandrels not only serve to calibrate and to expand the parisons but also as a means for transporting the thus obtained hollow plastic articles toward and past a series of additional treating and processing stations which are provided in the blow molding apparatus of FIGS. 1 to 14, the apparatus preferably comprises means for maintaining the cores of the mandrels in their outer end positions (corresponding to the position of the core of the mandrel 15a in FIG. 6) until such time when the hollow articles are stripped off the respective cores, whereupon the cores are either permitted or compelled to return to the inner end positions corresponding to the position of the core of the mandrel 15b shown in FIG. 6. For example, and referring to FIG. 2, the cores of the mandrels 15a–15c should remain in their respective outer end positions while advancing toward and around the driver sprockets 17a, 17b and thereupon along the lower stringers 14" all the way to a stripping station which accommodates an endless take-off conveyor 137 to be described in greater detail in connection with FIGS. 5 and 14. The holders 16a–16c for the blowing mandrels 15a–15c as well as the holders for the remaining blowing mandrels need not reciprocate with reference to the conveyor 14 but they are compelled to share all movements of the chains 14a, 14b. Thus, only the cores and the annular cutters will reciprocate but the holders and the sleeves remain fixed to the conveyor.

Of course, one could decide to rely on friction which exists between the tip of a core and the neck portion of the corresponding hollow plastic article so that the provision of special means for maintaining the cores in their outer end positions is not absolutely necessary. However, and in order to avoid accidental separation of hollow articles from the respective cores, I prefer to provide a locking device which insures that the cores cannot be retracted until after they advance beyond the stripping station. In other words, and referring to FIG. 2, it is necessary to provide a locking device which prevents retraction of the cores along the upper stringers 14' and along the left-hand end turn of the conveyor 14 while the blowing mandrels travel around the driver sprockets 17a, 17b. The cores are not likely to be retracted along the lower stringers 14" of the conveyor 14 because their tips are then located at the lower ends of the respective mandrels so that the force of gravity compels each core to remain in its outer end position corresponding to the position of the core of the mandrel 15a in FIG. 6. In some instances, a core advancing along the upper stringers 14' of the conveyor 14 is likely to be retracted in response to stepwise movements of the conveyor, particularly when the hollow articles are advanced past a series of cooling stations which follow the blowing station and at which the articles are cooled sufficiently to set and to be self-supporting. Therefore, I provide a locking device which is best shown in FIGS. 2, 6 and 7 and which comprises one but preferably two pivotable locking members here shown as elongated battens or strips 112, 113 which are adjacent to the path of the mandrels between the upper stringers 14' of the conveyor 14 and which are respectively biased by springs 116, 117. The battens 112, 113 are pivotable about horizontal hinges 114, 115 which are connected to the lower horizontal edge portions thereof so that the batten 112 tends to pivot about a horizontal axis and in a clockwise direction, as viewed in FIG. 7, whereas the batten 113 tends to pivot in a counterclockwise direction. The hinges 114, 115 are secured to stationary components of the frame structure F and are respectively located above the chains 14a, 14b. They are respectively located beneath the mold sections 12a, 12b so as to engage the cores of the mandrels 15a–15c at the time the cores are caused to perform their working strokes (cylinders 49a–49c). The upper edge portions of the battens 112, 113 may be moved to positions in which the distance therebetween is less than the diameter of the outer flange 103a, 103b or 103c so that the battens engage the undersides of these flanges and thereby prevent uncontrolled retraction of the respective cores. When the cores of the mandrels 15a–15c perform their respective working strokes at the time their tips 105a–105c respectively register with the extrusion nozzles 62a–62c, these tips and the flanges 103a–103c automatically pivot the battens 112, 113 against the bias of the springs 116, 117 so that the upper edge portions of the battens move away from each other and thereupon snap beneath the flanges 103a–103b to prevent retraction of the cores. The battens 112, 113 then take the positions shown in FIG. 7 wherein they prevent retraction (downward movement) of the core of the mandrel 15a.

The length of the battens 112, 113 approximates the length of the mold sections 12a, 12b (as seen in the longitudinal direction of the upper stringers 14' of the conveyor 14). FIGS. 2 and 6 show that the batten 112 is aligned with a further locking member here shown as a fixed batten 118 which engages the undersides of the flanges 103a–103c while the corresponding mandrels advance toward the driver sprockets 17a, 17b to make sure that the cores remain in their outer end positions. The batten 118 is followed by or is integral with an arcuate locking member 118' which surrounds the left-hand end turn of the conveyor 14 (as viewed in FIG. 2) so that the flanges 103a–103c are released only at the time the corresponding mandrels begin to travel in the space between the lower stringers 14". Of course, and if desired, the blow molding apparatus may comprise a second pair of locking members corresponding to the locking members 118, 118' and located at the opposite side of the mandrels which advance between the upper stringers 14' and around the left-hand end turn of the conveyor 14.

It is often sufficient to provide a single batten 112 or 113 as long as the batten is capable of preventing uncontrolled retraction of the cores when the corresponding cylinders (such as 49a–49c) cause their pistons to move away from the inner flanges of the cores.

Since the upper stringers 14' of the conveyor 14 are likely to yield in response to lateral or other stresses and since their links and pintles will begin to wear away after a certain period of use, I prefer to provide centering devices which insure that the cores of the mandrels will register accurately with the respective mold cavities and extrusion nozzles at the time they are caused to perform a working stroke in order to penetrate into the lower end portions of freshly extruded and separated parisons. The centering device 70 for the core of the mandrel 15a is illustrated in FIGS. 7 and 8. It comprises a forked centering member 70' which is reciprocable with the mold section 12a and a complementary second centering member 70" which is secured to and is reciprocable with the mold section 12b in directions at right angles to the straight upper stringers 14' of the conveyor 14. The width of the gap 71 between the prongs of the forked centering member 70' equals or exceeds only slightly the diameter of the sleeve 95a, and the web of the centering member 70' carries an adjustable threaded member here shown as a stop screw 72a which is disposed between the prongs and cooperates with a second adjustable stop screw 72b on the second centering member 72". When the mold sections 12a, 12b are moved toward each other to shut the blow mold 12, the prongs of the centering member 70' and the stop screws 72a, 72b cooperate to maintain the core of the mandrel 15a in accurate registry with the extrusion nozzle 62a so that the tip 105a of the core will calibrate the freshly extruded parison which is accommodated in the mold cavity 13a.

It is to be understood that the apparatus of FIGS. 1 to 14 comprises two additional centering devices 70 so that the cores of all mandrels which are temporarily located at the blowing station can be centered in a simultaneous operation. The distance between the centering members and the upper stringers 14' is such that an annular portion (e.g., the sleeve 95a of FIG. 10) automatically enters the space between the stop screws 72a, 72b when the mold 12 is open so that these stop screws engage the annular portion at the diametrically opposite sides thereof when the mold is shut.

FIG. 10 illustrates a guide device which guides the mold sections 12a, 12b at the time these mold sections are caused to move toward or away from each other. This guide device insures that the recesses which form the mold cavities 13a–13c will register with utmost accuracy so that the peripheries of hollow plastic articles will be free of fins or flashings which could develop if some plastic material were permitted to penetrate between the abutting end faces of the mold sections. Some plastic material will be permitted to enter the gaps provided between the lower end portions of the mold sections 12a, 12b (around the portions 102a–102c of the cavities 13a–13c) which is necessary because the cores of the mandrels cooperate with the mold sections to calibrate the neck portions of the articles whereby surplus plastic material must have some room to escape from the mold cavities. Also, the upper end portions of the mold sections 12a, 12b must provide a gap to accommodate surplus plastic materials 82 which extends outwardly beyond the bottom walls 81 of the articles and which is broken away by a deburring device including a revolving blade 79 shown in FIGS. 2 and 11. At the time the mold sections 12a, 12b are caused to move toward each other, their upper end portions automatically pinch and thereby seal the upper ends of the parisons which are accommodated in the mold cavities 13a–13c so that compressed blowing fluid which is subsequently admitted through the cores of the hollow blowing mandrels cannot escape from the mold and is compelled to expand the parisons against the surfaces surrounding the respective mold cavities.

Returning to FIG. 10, the guide device which guides the mold sections 12a, 12b comprises two parallel racks 163a, 163b which are respectively secured to carriers or platens 122a, 122b for the mold sections 12a, 12b and which mesh with a pinion 164. This pinion 164 rotates about the axis of a fixed shaft 164a which is located between the racks 163a, 163b so that the mold sections 12a, 12b are automatically guide in requisite alignment regardless of whether the platens 122a, 122b move toward or away from each other. Other types of guide devices may be used if desired as long as they are capable of insuring satisfactory alignment of the mold sections 12a, 12b at the time these sections move toward each other to define the mold cavities 13a–13c. The provisions of such guide device or devices is of particular importance when the cores of the blowing mandrels are caused to reciprocate axially in order to enter the corresponding mold cavities. As will be described in connection with FIGS. 15 and 16, it is also possible to construct the blow molding apparatus in such a way that the mandrels will be free to move at right angles to their respective axes but need not reciprocate in the axial direction thereof. In such modified apparatus, the provision of a guide device for the mold sections is of somewhat lesser importance.

FIGS. 2, 3 and 4 illustrate the details of a first cooling device provided at a first cooling station 73 which follows the blowing station (mold 12) and wherein the freshly extruded and expanded hollow articles 75a, 75b, 75c are subjected to a first cooling action which insures that the articles are sufficiently self-supporting to avoid excessive deformation during the remainder of their advance with the conveyor 14. Of course, it is also possible to cool the freshly blown articles right in the mold cavities 13a–13c; however, this would require longer stay of such articles at the blowing station with resultant reduction in the output of the blow molding apparatus. All that counts is to retain the freshly expanded hollow articles at the blowing station (in the mold cavities 13a–13c) for a period of time which is sufficient to insure that the articles can withstand (without excessive deformation) the trip to the cooling station 73 so that the cooling device at this cooling station will be in a position to eliminate certain minor deformations and to hold the articles in requisite position until they are cooled sufficiently to withstand repeating starting and arresting of the conveyor 14 on their way to the stripping station.

Before the conveyor 14 advances the freshly expanded articles to the first cooling station 73, the mold sections 12a, 12b are caused to move away from each other by a reciprocating mechanism one form of which will be described in greater detail in connection with FIGS. 15 and 16. The cores of the mandrels 15a–15c remain in their respective outer end positions because the flanges 103a–103c are locked by the battens 112, 113, whereupon the rack 23 (FIGS. 11 and 12) performs a working stroke and advances the conveyor 14 by a step whose length is sufficient to move the freshly extruded, calibrated and expanded hollow articles 75a–75c to the first cooling station 73. At this first cooling station, the articles 75a–75c may be cooled by jets of air or another suitable gaseous coolant within a span of time which corresponds to the interval between consecutive stepwise advances of the conveyor 14. The first cooling station 73 accommodates two hollow cooling sections 73', 73'' of an open-and-shut cooling form which are respectively connected with the platens 122a, 122b so that they may be moved toward or away from each other. Each of these sections 73', 73'' is formed with three recesses whose configuration and mutual spacing corresponds to that of the recesses in the mold sections 12a, 12b, i.e., the recesses of the sections 73', 73'' can form three cooling cavities 119a, 119b, 119c each of which automatically accommodates one of the hollow articles 75a–75c when the platens 122a, 122b are caused to move toward each other. In the embodiment of FIGS. 1–14, the sections 73', 73'' of the cooling form are made of sheet metal and one thereof is illustrated on an enlarged scale in FIG. 4. It will be noted that this one section 73' defines an internal chamber 73d which surrounds the respective cooling recesses and that its inner wall is formed with apertures or perforations 120 which allow jets of a gaseous cooling fluid to impinge against the peripheries of the respective hollow articles 75a–75c. The section 73' is further provided with a nipple which is connected to the discharge end of a supply hose 121a serving as a means for admitting a coolant to the chamber 73d and hence to the apertures 120. Of course, the walls surrounding the recesses of the sections 73', 73'' simultaneously serve to eliminate any deformation of the hollow articles 75a–75c as soon as the two hollow cooling sections are moved toward each other so that each hollow article is straightened out prior to actual cooling, i.e., at a time its material is still soft enough to undergo forcible deformation (or, better to say, "a straightening out") by contact with the walls which surround the cooling recesses. The cooling section 73'' is of similar construction and is connected to a supply hose 121b which serves to admit coolant against one half of each of the hollow articles 75a–75c.

It goes without saying that each of the mold sections 12a, 12b and each of the cooling sections 73', 73'' may consist of three separate parts each of which is then provided with one of the recesses which form the cavities 13a–13c, 119a–119c. However, in actual practice, the provision of a two-piece open-and-shut blow mold 12 and of a two-piece open-and-shut cooling form (sections 73', 73'') has been found to constitute a very simple, inexpensive and highly satisfactory solution, especially since the sections 12a, 119a and 12b, 119b are respectively mounted on a common carrier or platen (122a, 122b) so that two cylinders or similar reciprocating devices suffice to move the sections 12a, 12b and 73', 73'' toward or away from each other.

The cooling sections 73', 73'' may be formed of wire mesh so that the apertures 120 may be dispensed with since the interstices between the interlaced wires provide a large number of uniformly distributed perforations through which the gaseous coolant may flow to impinge against the peripheries of the hollow articles 75a–75c. The distance between any one of the cooling cavities 119a–119c and any one of the mold cavities 13a–13c is a whole multiple of the distance between a pair of blowing mandrels so that each cavity automatically registers with the core of a mandrel during each interval between consecutive intermittent advances of the conveyor 14.

The first cooling station 73 is followed by a second cooling station 123, as shown in FIGS. 2 and 3, which is adjacent to the horizontal portion 74 of the endless path for the blowing mandrels in the space between the upper stringers 14' of the conveyor 14. This second cooling station 123 accommodates two elongated horizontal pipes 76a, 76b which are respectively adjacent to the upper stringers 14' of the chains 14a, 14b at the opposite sides of the path for the articles and extend toward the driver sprockets 17a, 17b. The pipes 76a, 76b are respectively formed with elongated coolant-discharging slots 77a, 77b direct streams of air or another suitable coolant against the articles which are momentarily located at the second cooling station 123. The pipes 76a, 76b respectively receive coolant through a pair of supply hoses 78a, 78b which are connected to a suitable source of compressed air or the like, not shown, preferably the same source which supplies coolant to the aforementioned hoses 121a, 121b. The pipes 76a, 76b may discharge coolant intermittently or continuously so that the articles may be cooled between intermittent advances of the conveyor 14 or as long as they remain in the space between the slots 77a, 77b.

Additional cooling and straightening of the hollow articles 75a–75c may be effected by the provision of means for admitting streams of fluid coolant into the interior thereof while or after the articles are caused to advance through the cooling stations 73 and 123. The construction of the devices which admit compressed air or another coolant into the articles which are accommodated at the stations 73 and 123 is illustrated in FIGS. 2 and 13. Thus, the first cooling station 73 accommodates an elongated header 124 which is mounted in the space between the upper and lower stringers 14', 14'', and this header 124 is located ahead of a second header 125 which is accommodated at the second cooling station 123. The headers 124, 125 are connected to a source of coolant by means of flexible conduits 124′, 125′, and each header is rockable about a pair of fixed horizontal axes which extend at right angles to the stringers 14′, 14″.

The manner in which the header 124 is rockable upwardly toward the holders of the blowing mandrels at the first cooling station 73 is illustrated in part in FIG. 2 and in greater detail in FIG. 13. This header is articulately connected with the upper ends of two links 126, 127 and the lower ends of these links are rockable about the axes of two horizontal pivots 131′ one of which is shown in FIG. 13. The pivots 131′ of FIG. 13 (for the lower end of the link 126) is rotatable in a bearing sleeve 131 which is fixed to the frame structure F. This illustration shows the header 124 in its upper end position in which the header abuts against the lower end portions of the cores of three blowing mandrels 215a, 215b, 215c. The top wall of the header 124 is provided with four suitably spaced discharge openings three of which convey coolant to the axial passages of the cores of the mandrels 215a–215c so that the interior of each of the articles 75a–75c is subjected to simultaneous cooling and expanding (straightening) action of such coolant. In addition, the pressure of the coolant admitted through the cores of the mandrels 215a–215c opposes the pressure of coolant which is admitted through the apertures 120 of the cooling sections 73′, 73″ so that the walls of the hollow articles 75a–75c are free of dents or similar irregularities such as could develop if the plastic material were allowed to yield to the pressure of jets which are discharged through the apertures 120. The upper side of the header 124 is provided with suitable annular sealing rings 124″ (one shown in FIG. 13) which surround the respective discharge openings and which abut against the inner flanges of the cores of the mandrels 215a–215c, i.e., to such flanges which correspond to the flanges 106a, 106b of the cores shown in FIG. 6.

The pivot 131′ extends outwardly and beyond the bearing sleeve 131 and is connected to a link 130 which is articulately fixed to the piston rod of a double-acting hydraulic or pneumatic rocking cylinder 128. When the piston rod of the rocking cylinder 128 performs a working stroke (in a direction to the left, as viewed n FIG. 2 or in a direction toward the observer, as viewed in FIG. 13) the link 130 rotates the pivot 131′ and the latter rocks the links 126, 127 in a counterclockwise direction with the result that the header 124 is moved downwardly and away from the mandrels 215a–215c. Such rocking of the links 126, 127 takes place before the conveyor 14 advances by a step so that the header 124 cannot obstruct the advance of the upper stringers 14′.

The other header 125 which supplies a gaseous coolant to the interior of hollow articles at the second cooling station 123 is of identical construction and is rockable by a second double-acting hydraulic or pneumatic rocking cylinder 129 shown in FIG. 2. If necessary, the second cooling station 123 may be followed by one or more additional cooling stations, not shown, and the provision of such additional cooling stations is dependent on the length of intervals between consecutive advances of the conveyor 14, on the composition of the plastic material, on the wall thickness of the articles, on the desired uniformity of the ultimate products, on the cooling action of gaseous fluid which is admitted through the hoses 121a, 121b and 78a, 78b, and on certain other factors. Of course, the blow molding apparatus of FIGS. 1 to 14 preferably comprises suitable control devices which cause the headers 124, 125 to be rocked in synchronism and simultaneously discharge jets of coolant which enters the hollow articles at the cooling stations 73 and 123. In fact, it is possible to replace the headers 124, 125 by a single header which is then provided with a requisite number of discharge openings so that it may deliver coolant to all of the articles which are accommodated at the cooling stations 73, 123. Also, and if it is sufficient to admit coolant only into such articles which are accommodated at the first cooling station 73 (articles 75a–75c), the second header 125 may be disconnected or dispensed with. All such modifications are so obvious that each thereof will be readily understood by men skilled in this art without necessitating additional illustrations.

The discharge openings in the upper sides of the headers 124, 125 may be controlled by suitable one-way valves (not shown) which allow coolant to flow into the central passages of the cores at the cooling stations 73, 123 but which prevent escape of coolant as soon as the headers begin to move to their lower end positions. The valves may be opened by the inner ends of the cores which are momentarily located at the cooling stations 73 and 123. An important advantage of such one-way valves is that they prevent uncontrolled escape of coolant and also that they allow coolant (particularly gaseous coolant) to escape from the articles during intermittent advances of the conveyor 14 so that spent coolant is evacuated from the articles which leave the cooling station 73 before such articles receive fresh coolant at the cooling station 123, and that spent coolant may escape from the articles which leave the cooling station 123.

Once the thus cooled articles advance beyond the left-hand end turn of the conveyor 14 and enter the space between the lower stringers 14″, they travel along the aforementioned revolving blade 79 which rotates in a horizontal plane about the vertical axis of the output shaft of a small electric motor 80. The motor 80 is shown in FIGS. 2 and 11 and may be fixed to the frame structure F in such a way that the revolving blade 79 extends into the path of fins or burrs 82 projecting beyond the bottom walls 81 of the articles which advance in the space between the lower stringers 14″. The blade 79 is located at a point along which the articles advance between intermittent stoppages of the conveyor 14; i.e., the articles are preferably in motion at the time the blade 79 breaks away the fins 82. Such fins represent surplus material which is pinched between the upper end portions of the mold sections 12a, 12b at the time these mold sections are closed by platens 122a, 122b in order to bring the corresponding pairs of molding recesses into registry and to simultaneously seal the upper ends of freshly extruded parisons. Since each fin 82 is connected with the respective bottom wall 81 by a very thin diametrically extending web, the revolving blade 79 can break away the fins with sufficient accuracy so that the bottom walls 81 of the articles normally require no subsequent treatment. A single blade 79 will suffice to remove fins 82 from each of a group of three or four hollow articles between intermittent stoppages of the conveyor 14.

When the mold sections, 12a, 12b are closed to surround three parisons whose lower ends are to be calibrated by the cores of the momentarily aligned mandrels (e.g., of the mandrels 15a–15c in FIG. 2), the lower end portions of the mold sections 12a, 12b will deform the parisons to form the neck portions of the hollow articles whereby each article develops a pair of radially extending (diametrically opposed) fins which must be removed because they detract from the appearance of the finished products and because they could interfere with the operation of filling and sealing instrumentalities, not shown in the drawings. The right-hand portion of FIG. 12 illustrates a second deburring device which serves to remove radial fins or burrs 83a, 83b, 83c from the neck portions 91a, 91b, 91c of three bottles which are located at a second deburring station adjacent to and located at a level below the lower stringers 14″ of the conveyor 14. This second deburring device comprises three pairs of forked deburring members 84a–85a, 84b–85b, 84c–85c. A fixed double-acting cylinder 133, whose piston rod 134 is connected with the deburring members 84a, 84b, 84c, is located at the outer side of the chain 14a, and a similar fixed double-acting cylinder 135 comprises a reciprocable piston rod 136 whose free end is connected with the deburring members 85a, 85b, 85c. The cylinders 133, 135 are fixed to the frame structure F. The diameter of the piston which is connected with the piston rod 134 is greater than the diameter of the piston which reciprocates the piston rod 136 so that the piston rod 134 may transmit a greater force and is capable of advancing the deburring members 84a, 84b, 84c against the pressure of oil or another pressure medium in the cylinder 135. When the cylinders 133, 135 receive pressure medium to move the piston rods 134, 136 toward each other, the plate-like grippers 89a, 89b, 89c and 90a, 90b, 90c of the deburring members 84a–84c and 85a–85c engage the opposite sides of the fins 83a, 83b, 83c so that each fin is held between two cooperating grippers (89a–90a, 89b–90b or 89c–90c). As the deburring members 89a–89c continue to advance beyond the common plane of the fins 83a–83c (because the force produced by the piston in the cylinder 133 exceeds the force produced by the piston in the cylinder 135), the fins 83a–83c are broken away in a fully automatic way because the deburring members 85a–85c yield and are caused to move in a direction toward the cylinder 135. A detailed description of this deburring process will be found in my copending application Ser. No. 136,846.

A supporting platform 165 which is disposed at the level beneath the cylinders 133, 135 serves to prevent detachment of articles at the time the fins 83a–83c are being broken away from the neck portions 91a–91c. The upper side of this platform 165 is located at such a distance from the lower stringers 14″ that the bottom walls 81 of the articles can slide therealong whereby the articles cannot become detached from the tips of the respective cores, see particularly the right-hand part of FIG. 11.

In order to make sure that the fins 83a–83c will be centered between the pairs of cooperating grippers 89a–89c and 90a–90c, the blow molding apparatus comprises a second centering device which includes three centering forks 70a, 70b, 70c shown in FIG. 12 and serving to engage the mandrels at a point above the neck portions 91a–91c so that the cores and the articles suspended thereon are automatically centered with reference to the grippers 89a–89c and 90a–90c. Such centering is necessary in one direction only, namely, as seen in the longitudinal direction of the lower stringers 14″. In other words, when the prongs of the centering forks 70a–70c straddle the mandrels which are momentarily accommodated at the second deburring station, they insure that the neck portions 91a–91c are equidistant from each other and that each thereof is located between two pairs of cooperating grippers. The fins 83a–83c descend by gravity as soon as the piston rods 134, 136 are caused to move away from each other, and such broken-off fins may be collected in a suitable chute or the like, not shown, which is installed at a level below the platform 165.

The second deburring station (platform 165 and cylinders 133, 135) is located just ahead of a stripping or ejecting station which accommodates the aforementioned take-off conveyor 137 and at which the articles are stripped off the respective cores to be advanced to a next processing station, not shown. The stripping station is shown in FIGS. 2, 5 and 14, and it will be noted that it accommodates three forked stripping members 142a, 142b, 142c which respectively separate properly deburred hollow articles 146a, 146b, 146c from the cores of the mandrels 415a, 415b, 415c. The stripping members 142a–142c are secured to the free end of a piston rod 141 which is connected to a piston provided in a double-acting stripping or ejecting cylinder 139 shown in FIG. 14. The outer end of the cylinder 139 is articulately connected to a horizontal pivot pin 140 which is secured to the frame structure F and which is parallel with the lower stringers 14″. The cylinder 139 is rockable about the axis of the pin 140 by the piston rod 145 of a second cylinder 143 which is pivotable about a second pivot pin 144 also secured to the frame structure F.

When a new group of hollow plastic articles (such as the articles 146a–146c) enters the stripping station, the piston rods 141, 145 are retracted so that the stripping members 142a–142c are withdrawn from the path of the mandrels 415a–415c and that the cylinder 139 is held in its upper end position, not the one shown in FIG. 14. The blow molding apparatus then admits a pressure medium into the right-hand chamber of the cylinder 139 and shortly thereafter into the upper chamber of the cylinder 143 whereby the piston rod 141 first moves inwardly (i.e., into the space between the lower stringers 14″) so that the prongs of the stripping members 142a–142c respectively straddle the neck portions of the articles 146a–146c, whereupon the stripping members 142a–142c travel in an arc (in an anticlockwise direction, as viewed in FIG. 14) to strip the neck portions off the cores of the mandrels 415a–415c and to deposit the articles on the upper run of the take-off conveyor 137 which is a comparatively wide endless belt so that such articles may advance in a direction to the right, see the arrow 138 in FIGS. 5 and 14. In FIG. 14, the article 146c has been stripped off the mandrel 415c and is about to be deposited on the take-off conveyor 137. The upper run of the take-off conveyor 137 is spaced from the mandrels 415a–415c by a distance which exceeds the axial length of the articles 146a–146c, see FIG. 14.

The axes of the cylinders 139, 143 are located in a common vertical plane which is perpendicular to the planes of the chains 14a, 14b. It is obvious that these cylinders may be replaced by single-acting cylinders if the respective pistons are biased by suitable springs which normally tend to maintain the piston rods 141, 145 in retracted positions. This results in a simplification of the valve system which regulates the admission and escape of pressure medium from the cylinders 139, 143 (see the conduits 139a, 143a in FIG. 14).

When a group of articles (146a–146c) is stripped off the respective cores (mandrels 415a–415c), the piston rods 141, 145 are immediately retracted so that they allow the thus stripped articles to advance with the upper run of the take-off conveyor 137. In such retracted positions, the stripping members 142a–142c are moved from the path of advancing articles and allow a new group of articles to enter the stripping station. The cylinders 139, 143 are operated in synchronism with the advancing device which advances the conveyor 14 step-by-step, so that the consecutively advancing groups of articles are stripped in a fully automatic way between intermittent advances of the conveyor 14.

In order that the articles which are deposited on the take-off conveyor 137 may form a single file, the apparatus of my invention preferably includes an aligning device which is illustrated in FIGS. 1 and 5. This aligning device cooperates with and is mounted in part above and in part laterally of the upper run of the take-off conveyor 137. It comprises a U-shaped shifting member 149 which includes two spaced parallel rails 147, 148 extending in a horizontal plane across the upper run of the conveyor 137 and pivotable about the axis of a vertical shaft 150 which is located at the closed end of the member 149. This shaft carries a pinion 150a which meshes with a rack 150b provided at the free end of a piston rod 150c. The piston rod 150c is reciprocable in a double-acting shifting cylinder 150d which is connected to a source of fluid pressure medium and is operated at necessary intervals in order to rock the shifting member 149 to and from the phantomlike position 149', i.e., in and counter to the direction indicated in FIG. 5 by an arrow 150'. When the shifting member 149 is moved from a position of alignment with the lower stringers 14" to the position 149' of partial alignment with the upper run of the take-off conveyor 137, its open end 151 is adjacent to the intake end of an elongated channel 155 defined by two parallel rails 153, 154 which are respectively mounted on adjustable arms 156, 157 and 158, 159. During its travel to and from the position 149', the open end 151 of the shifting member 149 travels along an arcuate baffle plate 160 which prevents the articles 146a–146c from leaving the channel 149a between the rails 147, 148. The articles 146c, 146b, 146a (in such order) are then entrained seriatim by the upper run of the takeoff conveyor 137 to advance in a path indicated by the arrows 152a, 152b, 152c and to form a single file which is guided by the rails 153, 154. The arms 156–159 are mounted on two lateral frame members 160a, 160b which are adjacent to the marginal portions of the take-off conveyor 137, and the connections between these arms and the frame members 160a, 160b comprise suitable threaded spindles 160c and knurled tightening nuts 160d. The spindles 160c extend through elongated slots 160e in the arms 156–159 so that, upon loosening of the nuts 160d, each arm may be adjusted in the longitudinal direction thereof whereby the width of the channel 155 between the rails 153, 154 may be changed at the will of the operator. This is important when it becomes necessary to convert the blow molding apparatus for the manufacture of a different type of hollow articles.

The width of the channel 149a between the rails 147, 148 of the shifting member 149 exceeds only slightly the diameter of an article and, if desired, one of the rails 147, 148 may be made adjustable so that it can change the width of the channel 149a. Alternatively, the shifting member 149 may be made readily removable to be replaced by a differently dimensioned shifting member when the blow molding apparatus of my invention is utilized for the production of bottles or similar hollow articles whose diameters are greater or smaller than those of the articles 146a–146c shown in FIG. 5.

The aligning device of FIG. 5 is of considerable advantage for further processing of the articles because many modern bottle processing machines are constructed in such a way that they treat bottles which are advanced in a single file rather than in transversely extending rows each of which contains two or more bottles.

Once the mandrels have advanced beyond the stripping station, the cores should be caused to return to their inner end positions corresponding to the position of the core of the mandrel 15b shown in FIG. 6. While one could count on automatic gravitational retraction of the cores as soon as they advance past the right-hand end turn of the conveyor 14 (i.e., around the sprocket 18b of FIG. 2), it is advisable to make sure that each core is fully retracted prior to reaching the blowing station. This is achieved by the provision of an arcuate depressing rail 161 which is shown in FIG. 2 and which extends in an arc around the right-hand sprockets (only the sprocket 18b is shown) at such a distance from the respective holders that it engages the outer flanges 303a, 303b, 303c of the cores of the mandrels 15a', 15b', 15c' and returns them to their respective inner end positions. The depressing rail 161 is curved in such a way that the cores of the mandrels 15a'–15c' return gradually to their inner end positions and are ready to be moved outwardly as soon as the mold sections 12a, 12b are caused to close and to accommodate three freshly extruded parisons.

I wish to mention here that the blow molding apparatus of FIGS. 1 to 14 is constructed in such a way that it may extrude, calibrate, expand, cool, deburr, strip and align four articles at a time. As best shown in FIG. 2, each group of three mandrels (such as the mandrels 15a'–15c', 15a–15c and 215a–215c) is separated by an empty holder which can be connected with a mandrel whereby the blow molding apparatus may be readily converted for extrusion and intermittent treatment of four parisons and hollow articles at a time. All that is necessary is to replace the mold sections 12a, 12b and the cooling sections 73', 73" by similar sections each of which is formed with four equidistant recesses, and to effect suitable alteration of various deburring, centering, stripping and aligning devices. Analogously, the blow molding apparatus of FIGS. 1 to 14 may be converted for extrusion of two parisons and for simultaneous treatment of two articles at a time. While it is equally possible to use the apparatus of FIGS. 1 to 14 for extrusion of a single parison at a time, such operation is preferably carried out in a greatly simplified blow molding apparatus which will be described in connection with FIGS. 15 and 16.

The blow molding apparatus of FIGS. 1 to 14 operates in the following manner:

The conveyor 14 is assumed to be at a standstill in the position of FIG. 2 so that the cores of the blowing mandrels 15a–15c are respectively aligned with the extrusion nozzles 62a–62c and mold cavities 13a–13c. The machine 10 extrudes three plastic tubes 61a–61c in a simultaneous operation whereby the lower portions of the thus extruded tubes 61a–61c extend into the space between the mold sections 12a, 12b. These mold sections are then closed whereby they automatically sever three parisons from the tubes 61a–61c, and the lower end portion of each parison is accommodated in one of the lower end portions 102a–102c of the mold cavities 13a–13c. The annular pistons in the cylinders 49a–49c then causes the cores of the mandrels 15a–15c to move upwardly and to penetrate into the lower end portions of the parisons so that the corresponding cutters (i.e., the cutters 100a, 100b of FIG. 6 and the cutter on the core of the mandrel 15c) simultaneously trim the parisons. The trimming action is particularly satisfactory if the cores of the mandrels 15a–15c are rotated in a manner as described in connection with FIG. 6a.

During penetration of their cores into the lower end portions 102a–102c of the mold cavities 13a–13c, the mandrels 15a–15c deliver blasts of compressed blowing fluid which automatically expands the parisons and transforms them into bottles whose upper ends are closed by the walls 81 which carry diametrically extending fins 82. The fins 83a–83c are formed during penetration of cores into the lower end portions of the parisons. The cylinders 49a–49c then retract the respective pistons so that the delivery of compressed fluid into the freshly expanded articles is terminated and following a preliminary cooling of articles in the mold cavities 13a–13c, the mold sections 12a, 12b are moved apart and the conveyor 14 advances by a step to transfer the articles into the first cooling station 73 wherein the articles are cooled in a manner as described in connection with FIG. 3. At the same time, the cores of the mandrels 15a'–15c' (which are now located at the blowing station) cooperate with the mold sections 12a, 12b to form a new group of hollow articles. In response to a further stepwise advance of the conveyor 14, the articles which are supported by the cores of the mandrels 15a–15c enter the second cooling station 123 and are cooled by jets of coolant issuing from the slots 77a, 77b shown in FIG. 3. At the same time, the cores of the mandrels 415a–415c cooperate with the mold sections 12a, 12b to form a third group of hollow articles.

As the articles which are transported by the cores of the mandrels 15a–15c continue to advance between the upper stringers 14' and around the left-hand end turn of the conveyor 14, they eventually pass along the revolving blade 79 which removes the fins 82 before the partially deburred articles enter the second deburring station above the fixed platform 165. The removal of fins 83a–83c is carried out in a manner as described in connection with FIGS. 11 and 12, and the articles on the cores of the mandrels 15a–15c then reach the stripping station above the take-off conveyor 137 to be separated from the cores by the stripping members 142a–142c shown in FIGS. 2 and 14. The thus separated articles are thereupon shifted by the shifting member 149 and are caused to form a single file which advances in the channel 155 toward the next processing station and in a direction substantially at right angles to the planes of the chains 14a, 14b (see FIG. 1).

The next group of articles (on the cores of the mandrels 15a'–15c') is treated and advanced in the same way, and this next group of articles then follows the articles which advance in the channel 155. The third group of articles (on the cores of the mandrels 415a–415c) follows in the same way, and so forth, as long as the blow molding apparatus is in operation and as long as the machine 10 continues to extrude the tubes 61a–61c.

Each of the extrusion heads 11a–11c defines an internal annular chamber 190 which is parallel with the respective tube 61a–61c and which allows a tubular body of plastic material to travel toward the respective nozzles 62a–62c in response to reciprocation of a suitable extruding piston 191 or in response to continuous rotation of a screw in the housing of the extruding machine 10. The outline of each chamber 190 corresponds to the outline of the orifice in the respective nozzle. The exact construction of the extrusion heads 11a–11c forms no part of this invention and may be determined upon perusal of my copending application corresponding to German application K 48,942. If desired, the nozzles 62a–62c may be located at a greater distance from the mold 12 and the apparatus is then provided with suitable gripping devices (to be described in connection with FIGS. 15 and 16) which transfer requisite lengths of plastic tube into the respective mold cavities.

It is to be noted that the inner end portion of each core may be provided with a one-way valve which insures that compressed blowing fluid admitted at the blowing station remains entrapped in the respective article in order to prevent excessive deformation of the articles. Such valves, which will be described in connection with FIGS. 15 and 16, are particularly important when the cooling stations 73 and 123 are omitted, i.e., if an article is more or less self-supporting at the time it leaves the blowing station. The one-way valves are normally constructed in such a way that they maintain the interior of each freshly extruded and expanded article under a pressure which is higher than atmospheric pressure so that the articles can more readily withstand deforming stresses which develop in response to intermittent stoppages and advances of the conveyor 14 and particularly when the articles advance around the left-hand end turn of the conveyor (driver sprockets 17a, 17b).

The blow molding apparatus of FIGS 1 to 14 may accommodate additional treating and processing stations at which the articles undergo additional treatment. For example, I may provide a heating or firing station at which the articles are fired. Such firing is of importance when the articles consist of polyethylene and are to be provided with printed matter. The flaming or firing operation may be carried out at the time the articles are caused to rotate with the cores of the respective blowing mandrels (by means of a driving arrangement similar to the one shown in FIG. 6a or by an analogous driving arrangement) because such rotation of the articles insures that each side thereof is treated to the same extent.

Also, the articles may pass through a station at which they are ridden of static electricity.

A very important advantage of my blow molding apparatus is that the blowing mandrels need not be cooled. This is due to the fact that the core of each mandrel remains in the space between the mold sections 12a, 12b for a very short period of time and because each mandrel is thereupon cooled by atmospheric air as well as by streams of coolant which are admitted through the headers 124, 125. The period of time during which a mandrel moves in the path defined by the conveyor 14 to return into the blowing station is long enough to insure complete cooling of the mandrel. Also, and since the cores of the mandrels not only calibrate but also support and transport the articles all the way to the stripping station, the neck portions of the articles remain undeformed so that they will fit into caps which are applied thereto subsequent to sterilizing, drying and filling operations. Such operations may be performed while the articles advance on the take-off conveyor 137.

Another very important advantage of my blow molding apparatus is that the various treating and processing stations may be distributed at requisite distances from each other, either along the upper stringers 14' or along the lower stringers 14" of the conveyor 14. It is very advantageous to strip the articles along the lower stringers 14" because the neck portions are then located at the upper ends of the respective articles so that the take-off conveyor 137 supports the bottom walls 81. This is desirable for subsequent treatment of the articles and also because the articles are not likely to overturn. It will be readily understood that, were the articles separated from the cores of their mandrels at a point along the upper stringers 14', they would be hard to control and to align since each article resting on its neck portion would tend to overturn. On the other hand, and when the articles are stripped along the lower stringers 14" and if the articles are thereupon caused to form a single file (see FIG. 5), they may be advanced past a printing or labelling station with sufficient accuracy to insure uniform application of printed matter or of suitable labels to the same spot on each consecutive article.

Figure 15:
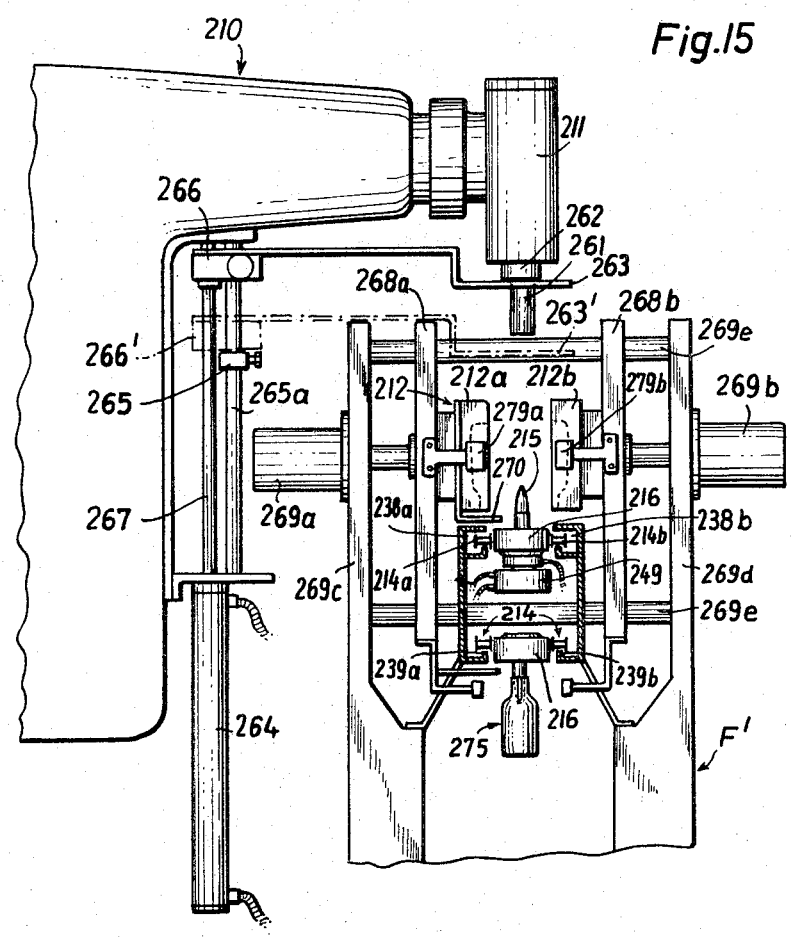
FIG. 15 is a fragmentary partly side elevational and partly vertical sectional view of a simplified blow molding apparatus wherein the nozzle of the extruding machine discharges a single plastic tube at a time.

Referring to FIGS. 15 and 16, there is shown a portion of a blow molding apparatus which also produces plastic bottles and similar articles in a mass-manufacturing operation. However, this blow molding apparatus is constructed and assembled to produce a single article at a time and comprises an extruding machine 210 having an extruding head 211 provided with an annular extrusion nozzle 262 which is arranged to extrude a continuous tube 261 of polyethylene or another suitable synthetic plastic material. The nozzle 262 is positioned in such a way that it extrudes the tube 261 downwardly and into the space between the sections 212a, 212b of an open-and-shut blow mold 212 mounted on a frame structure F' which is adjacent to the extruding machine 210. This frame structure F' further supports an endless advancing conveyor 214 here shown as comprising two endless link chains 214a, 214b which are mounted for travel in two spaced parallel vertical planes and whose links are connected with transversely extending holders 216 for blowing mandrels 215. The exact construction and mounting of the chains 214a, 214b is the same as described in greater detail in connection with FIGS. 1 to 14, and it suffices to say that the conveyor 214 is driven intermittently so that the mandrels 215 are advanced consecutively into registry with the extrusion nozzle 262 in such a way that a mandrel which is in temporary registry with the nozzle 262 extends into the space between the sections 212a, 212b of the blow mold 212. Each of the chains 214a, 214b comprises a horizontal upper stringer 214' and a horizontal lower stringer 214".

The mounting of the mandrels 215 in their respective holders 216 is shown in FIG. 16. Thus, each mandrel comprises a substantially conical outer portion or tip and an externally threaded inner portion which is screwed into a tubular nipple or carrier 240 having an axially extending passage 241 and provided with an annular collar 245. The inner end portion of the passage 241 accommodates a one-way valve 242 which permits compressed air or another blowing fluid to flow toward the mandrel 215 but prevents uncontrolled escape of such fluid in the opposite direction. The mandrel 215 is provided with an axial passage or bore (not shown) to admit compressed fluid into the interior of a parison which is obtained upon separation of a requisite length of tube 261 from the nozzle 262. The valve 242 comprises a cupped valve member 243 whose inwardly extending projection or stem 244 serves as a means for opening the valve at the time the blow mold 212 is closed and the parison contained in the mold cavity 212c is ready to be blown into the shape of a bottle or a similar hollow article. As shown, the nipple 240 comprises two sections which are connected by threads so that the valve 242 may be removed for the purpose of inspection, cleaning or replacement. The outer section of the nipple 240 serves as a stop for the valve member 243 when the valve 242 is in open position and the inner section of this nipple defines an annular seat 258 against which the valve member 243 abuts when the valve 242 is closed.

The holders 216 and the nipples 240 are constructed and assembled in such a way that the respective mandrels 215 are mounted with a certain amount of play, i.e., that each mandrel may move in directions at right angles to its axis. The collar 245 of the nipple 240 shown in FIG. 16 is accommodated with radial play in a circular recess 246 provided in the exposed side of the main body portion of the holder 216, and this holder comprises a detachable cover or lid 216m which overlies the collar 245 and which is formed with a bore 247 whose diameter exceeds the diameter of the nipple 240. The main body portion of the holder 216 is further provided with a bore 248 whose diameter exceeds the diameter of the inner section of the nipple 240 so that the nipple is free to move radially (namely, at right angles to the axis of the respective mandrel 215) but is held against axial movement with reference to the holder 216. Such mounting of the nipple 240 is necessary to insure proper centering of the mandrel with reference to the blow mold 212 and extrusion nozzle 262. The diameters of the recess 246 and bores 247, 248 on the one hand, and the diameters of the collar 245 and other sections of the nipple 240 on the other hand will determine the extent of radial play of the mandrel 215 with reference to the corresponding holder 216 and chains 214a, 214b.

The space between the upper and lower stringers 214', 214" of the chains 214a, 214b accommodates a device for supplying compressed blowing fluid into the passage 241 at such intervals that a blast of blowing fluid is admitted whenever the conical tip of a mandrel 215 extends into the open lower end of a freshly extruded parison. This fluid admitting device comprises a double-acting cylinder 249 which is fixedly mounted in the frame F' and which accommodates a reciprocable piston 250 having an upwardly extending rod 253 which carries at its upper end an enlarged head 254 adjacent to the one-way valve 242 of that holder 216 whose mandrel 215 is in temporary registry with the extrusion nozzle 262. Conduits 251, 252 serve to deliver or to evacuate a fluid pressure medium from cylinder chambers 259, 260 which are respectively provided above and below the piston 250. The head 254 of the piston rod 253 is connected with the radially extending discharge end of a supply conduit 255 for compressed air or another suitable blowing fluid and discharges into a bore having an outlet consisting of two upwardly extending ports 256a, 256b. The upper side of the head 254 is connected with an annular sealing ring 256 which comes into sealing abutment with the underside of the momentarily aligned nipple 240 when the piston 250 is caused to perform an upward stroke.

The fluid-admitting device including the double-acting cylinder 249 and piston 250 operates as follows:

When a holder 216 has been advanced by a step to move the corresponding mandrel 215 into the lower part of the space defined by the mold sections 212a, 212b and when the mold sections 212a, 212b are subsequently moved toward each other to surround a requisite length of the parison while the conical tip of the mandrel extends into the lower end of the parison, a valve in the conduit 252 opens and this conduit then admits a stream of pressure medium which causes the piston 250 to move upwardly and to press the sealing ring 256 against the nipple 240. The valve which controls the flow of pressure medium through the conduit 251 opens at the same time so that the pressure medium contained in the upper cylinder chamber 259 is free to escape while the volume of the lower cylinder chamber 260 increases. The supply conduit 255 then admits a blast of compressed fluid through the ports 256a, 256b, through the passage 241 of the nipple 240, and through the axial passage of the mandrel 215 to expand that portion of the parison which is accommodated in the cavity 212c of the closed blow mold 212. The blowing operation is continued until the parison is fully expanded and resembles a bottle or a similar hollow article. The mandrels 215 not only serve as a means for delivering compressed fluid into the blow mold 212 but also as a means for calibrating the necks of the articles by extending with requisite play into the space 212d defined by the lower portions of the mold sections 212a, 212b. This space 212d constitutes the lowermost zone of the mold cavity 212c. The blast of fluid delivered by the supply conduit 255 passes through the ports 256a, 256b and into a conical recess 257 in the inner end face of the nipple 240; this recess 257 is sealed from the atmosphere when the nipple 240 is in abutment with the sealing ring 256 and constitutes the inner end of the passage 241 in the nipple 240. The one-way valve 242 opens in a fully automatic way as soon as the sealing ring 256 reaches the nipple 240 because the head 254 then engages the valve stem 244 and shifts the valve member 243 upwardly and away from the seat 258 so that the fluid is free to penetrate into the passage 241 and through the axial passage of the hollow mandrel 215.

Before the conveyor 214 is advanced by a step, a suitable valve 255a in the supply conduit 255 terminates the outflow of compressed fluid and the conduit 251 simultaneously admits a stream of pressure medium into the upper cylinder chamber 259 so that the head 254 moves downwardly and away from the nipple 240. Another valve which controls the flow of fluid through the conduit 252 permits escape of spent pressure medium from the lower cylinder chamber 260 so that the piston 250 returns to the lower end position shown in FIG. 16. It is often preferred to actuate the various valves in such a sequence that some of the fluid entrapped in the article is free to escape prior to closing of the valve 242 in order to make sure that the expansion of the article cannot continue when the mold sections 212a, 212b are moved apart preparatory to further advance of the respective mandrel 215. This can be achieved in a very simple manner if the valve 255a which controls the flow of compressed fluid into and from the supply conduit 255 is a two-way valve which automatically permits some fluid to escape through an outlet 255b before the head 254 begins to move away from the nipple 240, i.e., before the valve 242 is permitted to close in response to pressure prevailing in the passage 241 above the valve member 243. Alternatively, the movement of the head 254 downwardly and away from the nipple 240 may take place at a speed which is sufficiently slow to permit escape of some of the fluid from the blown-up hollow article in the mold cavity 212c before the valve stem 244 is disengaged from the head 254 so that the valve member 243 may return into abutment with the valve seat 258. Both solutions may be resorted to in the apparatus of FIGS. 15 and 16 if desired. During admission of compressed fluid into the passage 241, the holder 216 serves as an abutment or stop for the head 254 and thereby limits the upward stroke of the piston 250. The pressure of the medium admitted into the lower cylinder chamber 260 is sufficient to insure satisfactory sealing action between the ring 256 and nipple 240 and to prevent uncontrolled escape of compressed fluid in the course of the blow molding operation. In order that the holder 216 whose mandrel 215 is in temporary registry with the extrusion nozzle 262 can withstand pressure transmitted by the head 254, the upper stringers 214' of the chains 214a, 214b are guided in strong fixed guide rails 238c, 238d which respectively define two horizontal channels 238a, 238b for the outer links of the chains 214a, 214b. The lower stringers 214" of the chains 214a, 214b are supported by L-shaped fixed guide rails 239a, 239b.

The blow molding apparatus of FIGS. 15 and 16 operates as follows:

In the first step, the conveyor 214 is advanced by a mechanism one form of which has been described in connection with FIGS. 11 and 12, whereby a mandrel 215 advances into the space between the mold sections 212a, 212b. These mold sections are held apart by the piston rods of two double-acting hydraulic or pneumatic cylinders 269a, 269b which are respectively mounted on columns 269c, 269d of the frame structure F'. The columns 269c, 269d are connected by parallel horizontal tie rods 269e for two reciprocable carriers or platens 268a, 268b which respectively carry the mold sections 212a 212b. The piston rods of the cylinders 269a, 269b are respectively connected with the platens 268a, 268b in a manner as shown in FIG. 15 and the flow of a suitable pressure medium to and from the chambers of the cylinders 269a, 269b is controlled by valves which are omitted in FIGS. 15 and 16 for the sake of clarity. It suffices to say that the valves which control the operation of the reciprocating cylinders 269a, 269b are operated in synchronism with the mechanism which advances the conveyor 214 so that the blow mold 212 closes automatically when the head 211 of the extruding machine 210 has expelled a requisite length of tube 261 which extends downwardly and into the mold cavity 212c so that the lower end of this tube surrounds the conical tip of the momentrily aligned mandrel 215. Alternatively, and as actually shown in FIGS. 15 and 16, the blow molding apparatus of my invention may be equipped with a combined gripping and severing device 263 which severs a length of tube 261 and transfers it downwardly so that the lower end of the thus obtained parison surrounds the conical top of the mandrel 215. For example, the gripping device 263 may simply tear off a requisite length of tube 261 in such a way that the lower end of the remainder of the tube remains open. The means for reciprocating the gripping device 263 comprises a double-acting vertical cylinder 264 which may be mounted on the housing of the extruding machine 210 and whose upwardly extending piston rod 267 carries at its upper end a block-shaped support 266 for the lefthand end of the gripping device 263. An adjustable stop 265 which is mounted on a fixed vertical rod 265a serves to limit the downward stroke of the gripping device 263, i.e., when the support 266 abuts the stop 265 (see the phantom-line position 266' in FIG. 15), the gripping device 263 takes the phantom-line position 263' which is selected in such a way that the parison is automatically placed onto the mandrel 215 and is accommodated in the space between the sections 212a, 212b of the open blow mold 212. The gripping device 263 may be provided with a suitable mechanism which automatically releases the parison when the support 266 reaches the phantom-line position 266'. Of course, the reciprocating means for the gripping device 263 may be modified in a number of ways without departing from the spirit of my invention, for example, by omitting the stop 265 and by providing an adjustable connection between the piston rod 267 and support 266. The valves which control the flow of a pressure medium into and from the cylinder 264 may be actuated by suitable limit switches one of which is then mounted on the stop 265 to reverse the direction of movement of the piston rod 267 and gripping device 263 when the support 266 reaches the positions 266'.

In the next step, the cylinders 269a, 269b move the platens 268a, 268b in a sense to close the blow mold 212 whereby one of the platens or another part which moves with the mold sections 212a, 212b opens the valve in the conduit 252 to admit pressure fluid into the lower chamber 260 of the cylinder 249 in order to lift the ring 256 on the head 254 into sealing engagement with the nipple 240 of that mandrel 215 whose conical tip is received in the parison. The conduit 255 then admits a blast of compressed fluid which flows through the passage 241 of the nipple 240 and expands the parison against the internal surfaces of the mold sections 212a, 212b so that the parison takes the form of a bottle 275 shown in the lower part of FIG. 15 or 16.

The mold section 212a carries a forked centering device 270 whose function is to insure that the mandrel 215 is properly aligned with the extrusion nozzle 262. The construction of this centering device 270 is the same as that of the centering device 70 shown in FIG. 8. Such centering of a mandrel 215 which is momentarily located beneath the blow mold 212 is possible owing to the aforedescribed mounting of the nipple 240 in the holder 216, i.e., owing to the fact that the nipple 240 and the mandrel 215 are free to move in directions at right angles to the axis of the mandrel.

The mold sections 212a, 212b are provided with upper edge portions 212a', 212b' which act not unlike pincers to automatically pinch the upper end of the parison when the blow mold 212 is closed, and any surplus plastic material then forms a flat fin or burr 282 which is shown in FIG. 16 by broken lines because it is preferably removed from the bottom wall 281 before the article 275 reaches the position shown in FIG. 16. Similar fins or burrs 283 are formed on the neck portion 291 of the article 275 when the mold sections 212a, 212b are closed because the lower end of the parison is then squeezed between the periphery of the mandrel 215 and the adjacent lower end portions of the mold sections. The fins 283 extend between the abutting faces of the mold sections 212a, 212b when the mold 212 is closed.

A modified device which separates the fins 283 from the finished article 275 is illustrated in the lower part of FIG. 16. It comprises two cooperating forked deburring members 289, 290 which are reciprocable in a horizontal plane in response to movement of platens 268a, 268b along the tie rods 269e. Thus, removal of the fins 283 will take place when the article 275 has advanced with the corresponding mandrel past the blowing station, along the remainder of the upper stringers 214' of the chains 214a, 214b, along one end turn of the conveyor 214, and between the lower stringers 214" to reach a position in which it is aligned with the mold 212. The neck portion 291 is then located at the upper end of the article 275 and is still supported by the corresponding mandrel 215. When the cylinders 269a, 269b thereupon close the mold 212, the deburring members 289, 290 are moved toward and straddle the neck portion 291 whereby the member 289 advances beyond the center of the respective holder 216 and breaks off the fins 283. It will be noted that FIG. 16 illustrates only one fin 283 because the other fin is concealed by the neck portion 291. The deburring member 289 is mounted at the inner end of a cylindrical boss 284 which is fixed to a horizontal bar 286 mounted on the lower end portion of the platen 268a. The member 290 is mounted on a cylindrical boss 285 which is reciprocable along the inner end portion of a second horizontal bar 287. This bar 287 is secured to the lower end portion of the platen 268b and supports a helical expansion spring 288 which serves to bias the boss 285 in a direction toward the member 289 to the extent permitted by a suitable stop 285a in the interior of the boss 285. When the platens 268a, 268b are caused to move toward each other, the member 289 presses the fins 283 against the member 290 with such a force that the spring 288 yields and allows the boss 285 to move the platen 268b whereby the fins 283 are automatically broken off the neck portion 291. A suitable moving apron or a chute 284a is provided beneath the deburring members 289, 290 to collect the fins 283 and to deliver them to a receptacle, not shown.

A second centering device 270d is provided on the platen 268a and serves to automatically center the nipple 240 of that mandrel 215 which is momentarily located between the members 289, 290 to make sure that the article 275 is held in requisite position when the members 289, 290 remove the fins 283.

FIG. 15 shows a pair of bracing members 279a, 279b which are respectively supported by the platens 268a, 268b and serve to prop that article 275 which has been advanced beyond the blow mold 212. Thus, the bracing members 279a, 279b are located past the mold, as viewed in the direction of movement of the conveyor 214, and their purpose is to prevent excessive deformation of articles at the time the articles are still soft enough to undergo undesirable deformation in response to stepwise advances of the conveyor 214. Of course, and depending on the nature of the plastic material (and on the speed at which the conveyor 214 is caused to advance in its endless path), the apparatus of FIGS. 15 and 16 may be provided with two or more pairs of bracing members 279a, 279b which are suitably spaced from each other along the upper stringers 214' of the chains 214a, 214b so that a freshly blown article 275 may be supported during two or more intervals between consecutive advances of the conveyor 214. The bracing members 279a, 279b automatically engage and prop consecutive articles 275 because they move toward and away from each other at the same intervals as the mold sections 212a, 212b. As has been described in connection with FIGS. 1 to 14, the bracing members may simultaneously perform a cooling action by directing jets of air or another coolant against the peripheries of the freshly extruded and expanded articles until the articles have become self-supporting and cannot undergo excessive deformation when they advance toward the stripping station, not shown in FIGS. 15 and 16.

In order to make sure that the freshly extruded and expanded articles 275 cannot undergo undesirable deformation at the time their material is still too soft to be self-supporting, I often prefer to construct the blow molding apparatus in such a way that the apparatus admits a blast of compressed fluid into that article 275 which is momentarily propped by the bracing members 279a, 279b. Since the compressed fluid need not be hot, it acts as a coolant and contributes to rapid cooling of the articles so that a single pair of bracing members 279a, 279b normally suffices to prevent deformation of articles on their way to the stripping station. The manner in which blasts of compressed coolant may be admitted into articles at one or more points past the blowing station has been described in connection with FIGS. 1 to 14.

Without further analysis, the foregoing will so fully reveal the gist of the present invention that others can, by applying current knowledge, readily adapt it for various applications without omitting features which fairly constitute essential characteristics of the generic and specific aspects of this invention and, therefore, such adaptations should and are intended to be comprehended within the meaning and range of equivalence of the following claims.

What is claimed as new and desired to be secured by Letters Patent is:

1. In an apparatus for the production of hollow plastic articles, in combinataion, an extruding machine including an extrusion nozzle arranged to discharge a plastic tube vertically downwardly; a conveyor arranged to advance in a predetermined path comprising a portion adjacent to but spaced from said nozzle; a plurality of mandrels secured to said conveyor; and advancing means for intermittently advancing said conveyor through such distances that one of said mandrels is located in said portion of said path in vertical position below and registers with said nozzle during each interval between intermittent advances of said conveyor and that said one mandrel remains in vertical position, at least for a short period of time, during movement away from registry with said nozzle.

2. In an apparatus for the production of hollow plastic by the blow molding method, in combination, an extruding machine including an extrusion nozzle arranged to discharge a plastic tube vertically downwardly; an endless conveyor arranged to advance in an endless path comprising a portion located to below and spaced from said nozzle; an open-and-shut blow mold disposed between said nozzle and said portion of said path and defining a cavity arranged to accommodate a length of tube issuing from said nozzle; a plurality of blowing mandrels secured to said conveyor; and advancing means for intermittently advancing said conveyor through such distances that one of said mandrels is located in said portion of said path in vertical position and registers with said cavity and said nozzle during each interval between intermittent advances of said conveyor and that said one mandrel remains in vertical position, at least for a short period of time, during movement away from registry with said nozzle.

3. In an apparatus for the production of hollow plastic articles by the blow molding method, in combination, an extruding machine comprising an extrusion nozzle arranged to discharge a plastic tube vertically downwardly; a conveyor arranged to advance in an endless path comprising a horizontal portion adjacent to but spaced from and located below said nozzle; a plurality of blowing mandrels secured to said conveyor in such a way that a mandrel located in said horizontal portion of said path extends vertically upwardly from said conveyor; and advancing means for intermittently advancing said conveyor through such distances that a mandrel located in said horizontal portion of said path registers with said nozzle during each interval between consecutive intermittent advances of said conveyor, such mandrel being held in vertical position during movement away from registry with said nozzle while remaining in said horizontal portion of said path.

4. In an apparatus for the production of hollow plastic articles by the blow molding method, in combination, an extruding machine including a plurality of parallel extrusion nozzles each arranged to discharge a plastic tube vertically downwardly; a conveyor arranged to advance in an endless path comprising a portion adjacent to but spaced from and located below said nozzles; a plurality of grouped blowing mandrels supported by said conveyor whereby the number and spacing of mandrels in each group equals the number and spacing of said nozzles, the mandrels of a group which is momentarily located in said portion of said path being held in vertical positions and registering with said nozzles; and advancing means for intermittently advancing said conveyor through such distances that each mandrel of a group located in said portion of said path registers with one of said nozzles during each interval between consecutive intermittent advances of said conveyor, each mandrel of such group being held by said conveyor in vertical position, at least for a short period of time, during travel away from registry with the respective nozzle.

5. In an apparatus for the production of hollow plastic articles by the blow molding method, in combination, an extruding machine including a plurality of parallel extrusion nozzles each arranged to discharge a plastic tube vertically downwardly; a conveyor arranged to advance in an endless path comprising a horizontal portion adjacent to but spaced from and located at a level below said nozzles; a plurality of grouped blowing mandrels supported by said conveyor whereby the number and spacing of mandrels in each group equals the number and spacing of said nozzles, the mandrels of a group which is momentarily located in said horizontal portion of said path extending upwardly and being parallel with said nozzles; an open-and-shut blow mold disposed between said nozzles and said horizontal portion of said path and defining a plurality of cavities each arranged to accommodate a length of tube issuing from one of said nozzles; and advancing means for intermittently advancing said conveyor through such distances that each mandrel of a group located in said horizontal portion of said path registers with one of said nozzles and with the respective cavity during each interval between consecutive intermittent advances of said conveyor and that each such mandrel remains parallel with said nozzles, at least for a short period of time, during travel away from registry with the respective nozzle.

6. In an apparatus for the production of bottles and similar hollow thermoplastic articles by the blow molding method, in combination, an extruding machine comprising at least one nozzle arranged to discharge a length of thermoplastic tube vertically downwardly; an endless conveyor arranged to advance in an endless path comprising a horizontal portion adjacent to but spaced from and located at a level below said nozzle; an open-and-shut blow mold comprising a pair of mold sections located between said nozzle and said horizontal portion of said path, at least one of said mold sections being movable toward and away from the other section and said sections together defining a mold cavity arranged to accommodate a length of plastic tube issuing from said nozzle; a plurality of blowing and calibrating mandrels supported by said conveyor, at least one of said mandrels which is momentarily located in said horizontal portion of said path extending upwardly from said conveyor; and advancing means for intermittently advancing said conveyor through such distances that, during each interval between consecutive intermittent advances of said conveyor, a mandrel located in said horizontal portion of said path registers with said nozzle and may be received in that length of plastic tube which is accommodated in said mold cavity, such mandrel being held by said conveyor means in vertical position during travel away from registry with said nozzle while remaining in said horizontal portion of said path.

7. In an apparatus for the production of hollow plastic articles, particularly for the production of hollow thermoplastic bottles and the like, in combination, an extruding machine including an extrusion nozzle arranged to discharge a plastic tube vertically downwardly; a conveyor arranged to advance in an endless path comprising a horizontal portion adjacent to but spaced from and located at a level below said nozzle, said conveyor comprising a pair of spaced endless flexible elements having parallel upper stringers disposed in said horizontal portion of said path; a plurality of holders secured to and extending transversely between said flexible elements; a mandrel secured to each of said holders and extending outwardly from said conveyor so that the mandrels momentarily located in said horizontal portion of said path extend vertically upwardly; and advancing means for intermittently advancing said conveyor through such distances that, during each interval between consecutive intermittent advances of said conveyor, a mandrel momentarily located in said horizontal portion of said path is held in vertical position and registers with said nozzle, such mandrel being held by said conveyor in vertical position, at least for a short period of time, during travel away from registry with said nozzle.

8. In an apparatus for the production of hollow plastic articles, particularly for the production of hollow thermoplastic bottles and the like, in combination, an extruding machine including an extrusion nozzle arranged to discharge a plastic tube downwardly; a conveyor arranged to advance in an endless path comprising a horizontal portion adjacent to but spaced from and located at a level below said nozzle, said conveyor comprising a pair of spaced endless link chains having parallel upper stringers disposed in said horizontal portion of said path; a plurality of holders secured to the links of and extending transversely between said chains; a mandrel secured to each of said holders and extending outwardly from said conveyor so that the mandrels momentarily located in said horizontal portion of said path extend vertically upwardly; and advancing means for intermittently advancing said conveyor through such distances that, during each interval between consecutive intermittent advances of said conveyor, a mandrel momentarily located in said horizontal portion of said path registers with said nozzle, such mandrel being held by said conveyor in vertical position, at least for a short period of time, during travel away from registry with said nozzle.

9. In an apparatus for the production of hollow plastic articles, in combination, an extruding machine including an extrusion nozzle arranged to discharge a plastic tube vertically downwardly; a conveyor arranged to advance in a predetermined path having a portion adjacent to but spaced from said nozzle; a plurality of blowing mandrels secured to said conveyor; advancing means for intermittently advancing said conveyor through such distances that one of said mandrels is located in said portion of said path in vertical position to register with said nozzle during each interval between intermittent advances of said conveyor, said one mandrel being held by said conveyor in vertical position, at least for a short period of time, during travel away from registry with said nozzle; an open-and-shut blow mold comprising a pair of mold sections located between said nozzle and said portion of said path, said mold sections having recesses and being movable toward and away from each other whereby said recesses define a mold cavity which registers with said nozzle and which may receive a length of plastic tube when said mold sections are moved toward each other; and guide means for guiding said mold sections during such movements.

10. In an apparatus for the production of hollow thermoplastic articles, in combination, an extruding machine including an extrusion nozzle having a vertical axis and arranged to discharge a plastic tube vertically downwardly; a conveyor arranged to advance in a predetermined path having a straight horizontal portion adjacent to but spaced from and extending substantially at right angles to the axis of and below said nozzle; a plurality of spaced holders secured to said conveyor; an elongated blowing mandrel mounted in each of said holders and movable with reference to the respective holder in directions at right angles to the axis thereof, each mandrel which is temporarily located in said straight portion of said path extending upwardly from said conveyor and its axis being at least nearly parallel with the axis of said nozzle; an open-and-shut blow mold disposed between said nozzle and said horizontal portion of said path and defining a mold cavity which registers with said nozzle when the mold is shut so that a length of plastic tube may be accommodated and expanded in said mold cavity; advancing means for intermittently advancing said conveyor through such distances that, during each interval between intermittent advances of said conveyor, one of said mandrels is held in vertical position and registers at least approximately with said nozzle and with said mold cavity whereby said one mandrel may extend into one end of the tube in said mold cavity to expand the same, said one mandrel being held by said conveyor in vertical position, at least for a short period of time, during travel away from registry with said nozzle; and centering means for automatically centering said one mandrel into accurate registry with said nozzle.

11. In an apparatus for the production of hollow thermoplastic articles, in combination, an extruding machine including an extrusion nozzle having a vertical axis and arranged to discharge a plastic tube vertically downwardly; a conveyor arranged to advance in a predetermined path having a straight horizontal portion adjacent to but spaced from and extending substantially at right angles to the axis of said nozzle; a plurality of spaced holders secured to said conveyor; an elongated blowing mandrel mounted in each of said holders and comprising an elongated core movable axially with reference to the respective holder, each mandrel which is temporarily located in said straight portion of said path extending vertically upwardly from said conveyor and its axis being at least nearly parallel with the axis of said nozzle; an open-and-shut blow mold disposed between said nozzle and said horizontal portion of said path and defining a mold cavity which registers with said nozzle when the mold is shut so that a length of plastic tube may be accommodated and expanded in said mold cavity; and advancing means for intermittently advancing said conveyor through such distances that, during each interval between intermittent advances of said conveyor, one of said mandrels registers at least approximately with said nozzle and with said mold cavity whereby said one mandrel may extend into one end of the tube in said mold cavity to expand the same, such one mandrel being held by said conveyor in substantially vertical position, at least for a short period of time, during travel away from registry with said nozzle.

12. A combination as set forth in claim 11, wherein each of said cores is provided with an axial passage and further comprising means for admitting a blowing fluid into the passage of that core which registers with said nozzle, said fluid admitting means comprising a double-acting cylinder, an annular piston reciprocable in said cylinder, a hollow piston rod connected with said piston and coaxial with said nozzle, said piston rod being arranged to engage and to move the temporarily aligned core axially toward said nozzle and into said mold cavity when the piston performs a working stroke, and means for admitting a blowing fluid through said piston and into said hollow piston rod so that such fluid may flow through the core and into the plastic tube in said mold cavity.

13. In an apparatus for the production of hollow articles by the blow molding method, in combination, an extruding machine including an extrusion nozzle having a vertical axis and arranged to discharge a plastic tube downwardly; an endless advancing conveyor mounted for movement in an endless path comprising a horizontal portion adjacent to but spaced from and located below said nozzle, said conveyor having an upper stringer located in the horizontal portion of said path and a lower stringer; an open-and-shut blow mold disposed between said nozzle and said upper stringer, said mold having a mold cavity arranged to receive a length of plastic tube and, on closing thereof, said mold being arranged to seal the upper end of such length of tube whereby the thus obtained parison develops a fin which extends upwardly therefrom; a plurality of hollow blowing mandrels secured to and movable with said conveyor, each mandrel which is temporarily located in the horizontal portion of said path extending vertically upwardly from said upper stringer and each mandrel which is temporarily supported by said lower stringer extending downwardly therefrom; advancing means for intermittently advancing said conveyor through such distances that, during each interval between intermittent advances of said conveyor, one of said mandrels registers with said nozzle and extends into the lower end of the parison in said mold cavity so that, upon admission of a blowing fluid through said one mandrel, the parison expands against the surfaces surrounding the mold cavity and remains temporarily connected with the respective mandrel while the mandrel advances with the conveyor after opening of said mold, such mandrel being held by said conveyor in vertical position, at least for a short period of time, during travel away from registry with said nozzle; and deburring means adjacent to the path of articles which are supported by and advance with the mandrels past said mold for separating the fins from such articles.

14. In an apparatus for the production of hollow plastic articles by the blow molding method, in combination, an extruding machine including an extrusion nozzle arranged to discharge a plastic tube vertically downwardly; a conveyor mounted for movement in a predetermined path comprising a portion located at a level below and spaced from said nozzle; an open-and-shut blow mold comprising sections which define a mold cavity arranged to receive a length of plastic tube; a gripping device movable between two spaced positions in one of which it receives a length of tube from said nozzle and in the other of which it delivers such length of tube into said mold cavity; a plurality of mandrels secured to said conveyor; and advancing means for intermittently advancing said conveyor through such distances that one of said mandrels extends vertically upward to register with said nozzle and extends into the length of tube in said mold cavity during each interval between consecutive intermittent advances of said conveyor, said one mandrel being held by said conveyor in vertical position, at least for a short period of time, during travel away from registry with said nozzle.

15. In an apparatus for the production of hollow plastic articles by the blow molding method, in combination, an extruding machine including an extrusion nozzle arranged to discharge a plastic tube vertically downwardly, said machine comprising a head having an annular chamber coaxial to and communicating with the orifice provided in said nozzle, and means for advancing plastic material through said chamber and through said orifice; an endless conveyor arranged to advance in an endless path comprising a portion adjacent to but spaced from said nozzle; an open-and-shut blow mold disposed between said nozzle and said portion of said path and defining a cavity arranged to accommodate a length of plastic tube; a plurality of blowing mandrels secured to said conveyor; and advancing means for intermittently advancing said conveyor through such distances that one of said mandrels is located in said portion of said path in vertical position and registers with said nozzle and said cavity during each interval between intermittent advances of said conveyor, said one mandrel being held by said conveyor in vertical position, at least for a short period of time, during travel away from registry with said nozzle.

16. In an apparatus for the production of hollow plastic articles by the blow molding method, in combination, an extruding machine including a plurality of parallel extrusion nozzles each arranged to discharge a plastic tube vertically downwardly; an endless conveyor arranged to advance in an endless path comprising a substantially horizontal portion located beneath and spaced from said nozzles, said conveyor including at least one endless flexible element having a horizontal upper stringer located in the horizontal portion of said path and a lower stringer; an open-and-shut blow mold disposed between said nozzles and the horizontal portion of said path and defining a plurality of substantially vertically extending mold cavities each of which is adapted to receive a length of plastic tube from one of said nozzles; a plurality of hollow blowing mandrels secured to said flexible element and disposed in groups in each of which the number and spacing of mandrels correspond to that of said mold cavities, said mandrels extending vertically upwardly during their advancement with the upper stringer of said flexible element; and advancing means for intermittently advancing said flexible element through such distances that, during each interval between consecutive intermittent advances of said conveyor, a group of mandrels is held in vertical position to register with said nozzles and may extend into lengths of plastic tube in said mold cavities, the mandrels of such group being held by said conveyor in vertical positions, at least for a short period of time, during travel away from registry with the respective nozzles.

17. A combination as set forth in claim 16, further comprising a holder for each of said mandrels, said holders being connected with said flexible element and each mandrel being movable axially with reference to the respective holder.

18. A combination as set forth in claim 16, further comprising means for admitting a blowing fluid through each mandrel of that group whose mandrels register with said mold cavities whereby the mandrels expand the respective lengths of tube to form hollow articles which are temporarily supported by the respective mandrels.

19. A combination as set forth in claim 18, wherein the means for admitting a blowing fluid to said mandrels comprises a plurality of double-acting cylinders disposed between said stringers and each comprising a hollow piston rod registering with one of said mold cavities and movable into temporary engagement with a mandrel.

20. A combination as set forth in claim 18, further comprising a plurality of treating and processing stations adjacent to said stringers and located past said blow mold as seen in the direction in which said mandrels advance with said conveyor.

21. In an apparatus for the production of bottles and similar hollow thermoplastic articles by the blow molding method, in combination, an extruding machine comprising at least one nozzle arranged to discharge a length of thermoplastic tube downwardly; an endless conveyor arranged to advance in an endless path comprising a horizontal portion adjacent to but spaced from and located at a level below said nozzle; an open-and-shut blow mold comprising a pair of mold sections located between said nozzle and said horizontal portion of said path, at least one of said mold sections being movable toward and away from the other section and said sections together defining a mold cavity arranged to accommodate a length of plastic tube issuing from said nozzle; a plurality of hollow blowing and calibrating mandrels supported by said conveyor, at least one of said mandrels which is momentarily located in said horizontal portion of said path extending upwardly from said conveyor; advancing means for intermittently advancing said conveyor through such distances that, during each interval between consecutive intermittent advances of said conveyor, a mandrel located in said horizontal portion of said path is held in vertical position to register with said nozzle and may be received in that length of plastic tube which is accommodated in said mold cavity to expand the same and to thereby form a shaped article which remains temporarily supported by the respective mandrel, such mandrel being held by said conveyor in vertical position, at least for a short period of time, during travel away from registry with said nozzle; and at least one treating station adjacent to said path and located past said mold for treating the articles while such articles are still supported by the respective mandrels.

22. In an apparatus for the production of hollow plastic articles by the blow molding method, in combination, an extruding machine including an extrusion nozzle arranged to discharge a plastic tube vertically downwardly; a conveyor arranged to advance in an endless path comprising a horizontal portion spaced from and located below said nozzle, said conveyor including an endless flexible element having an upper stringer located in said horizontal portion of said path, a lower stringer and two end turns at the ends of said upper stringer; a plurality of holders secured to said flexible element; a hollow blowing mandrel axially movably secured to each of said holders and extending substantially vertically upwardly when the respective holder is located in said horizontal portion of said path, each of said mandrels being movable between an inner end position and an outer end position and each thereof having a tip and a projection adjacent to said tip thereof; an open-and-shut blow mold located above said horizontal portion of said path and defining a mold cavity which registers with one of said mandrels during each interval between intermittent advances of said conveyor, each mandrel being held by said conveyor in vertical position, at least for a short period of time, during travel away from registry with said cavity; a cylinder disposed between said stringers and arranged to move mandrel which registers with said mold cavity to the outer end position thereof; and locking means for retaining said mandrels in the outer end positions thereof during intermittent advances of said mandrels along at least a part of said horizontal portion of said path and while the mandrels advance past said blow mold toward one of said end turns.

References Cited

UNITED STATES PATENTS

| | | | |
|---|---|---|---|
| 2,819,490 | 1/1958 | Froot | 18—5 XR |
| 2,903,740 | 9/1959 | Parfrey | 18—5 |
| 2,928,120 | 3/1960 | Leghorn et al. | 18—5 XR |
| 3,009,198 | 11/1961 | Kalman et al. | 18—5 |
| 3,075,239 | 1/1963 | Strong | 18—5 |
| 3,149,373 | 9/1964 | Marzillier | 18—5 |
| 3,186,028 | 6/1965 | Dobbins et al. | 18—5 |

FOREIGN PATENTS 1,249,682  11/1960  France.

J. SPENCER OVERHOLSER, *Primary Examiner.*

ROBERT F. WHITE, *Examiner.*

A. R. NOE, W. L. McBAY, *Assistant Examiners.*